(12) United States Patent
Kong et al.

(10) Patent No.: US 12,148,893 B2
(45) Date of Patent: Nov. 19, 2024

(54) CAPACITY REGENERABLE EXCESS ELECTROLYTE Zn ION BATTERY

(71) Applicant: Hunt Energy Enterprises, L.L.C., Dallas, TX (US)

(72) Inventors: Fantai Kong, McKinney, TX (US); Mark Griffin, Dallas, TX (US); Jin-Myoung Lim, Coppell, TX (US)

(73) Assignee: Hunt Energy Enterprises, L.L.C., Dallas, TX (US)

( * ) Notice: Subject to any disclaimer, the term of this patent is extended or adjusted under 35 U.S.C. 154(b) by 0 days.

(21) Appl. No.: 18/045,196

(22) Filed: Oct. 10, 2022

(65) Prior Publication Data

US 2023/0065988 A1  Mar. 2, 2023

Related U.S. Application Data

(63) Continuation of application No. 17/001,300, filed on Aug. 24, 2020, now Pat. No. 11,469,452.

(Continued)

(51) Int. Cl.
  *H01M 10/42* (2006.01)
  *H01M 4/04* (2006.01)
  (Continued)

(52) U.S. Cl.
  CPC ..... *H01M 10/4242* (2013.01); *H01M 4/0404* (2013.01); *H01M 4/045* (2013.01);
  (Continued)

(58) Field of Classification Search
  CPC ........... H01M 10/4242; H01M 10/615; H01M 10/6571; H01M 10/658; H01M 10/6595;
  (Continued)

(56) References Cited

U.S. PATENT DOCUMENTS 4,910,100 A * 3/1990 Nakanishi ........... H01M 8/2457
                                                  429/441
5,439,757 A * 8/1995 Zito .................. H01M 8/04186
                                                  429/50

(Continued)

FOREIGN PATENT DOCUMENTS

CN  107394293 A    11/2017
CN  108448047 A *  8/2018  .......... H01M 10/441

(Continued)

OTHER PUBLICATIONS

CN-108448047-A, translation through PE2E search (Year: 2018).*

(Continued)

*Primary Examiner* — Jimmy Vo
(74) *Attorney, Agent, or Firm* — Patent Capital Group

(57) ABSTRACT

Battery systems, methods of in-situ grid-scale battery construction, and in-situ battery regeneration methods are disclosed. The battery system features controllable capacity regeneration for grid-scale energy storage. The battery system includes a battery comprising a plurality of cells. Each cell includes a cathode comprising cathode electrode materials disposed on a first current collector, an anode comprising anode electrode materials disposed on a second current collector, a separator or spacer disposed between the cathode and the anode an electrolyte to fill the battery in the spaces between electrodes. The battery system includes a battery system controller, wherein the battery system controller is configured to selectively charge and discharge the battery at a normal cutoff voltage and wherein the battery system controller is further configured to selectively charge and discharge the battery at a capacity regeneration voltage as part of a healing reaction to generate active electrode materials.

19 Claims, 20 Drawing Sheets

Related U.S. Application Data

(60) Provisional application No. 62/934,314, filed on Nov. 12, 2019.

(51) Int. Cl.

| | |
|---|---|
| *H01M 4/62* | (2006.01) |
| *H01M 4/66* | (2006.01) |
| *H01M 10/02* | (2006.01) |
| *H01M 10/054* | (2010.01) |
| *H01M 10/44* | (2006.01) |
| *H01M 10/46* | (2006.01) |
| *H01M 10/615* | (2014.01) |
| *H01M 10/6571* | (2014.01) |
| *H01M 10/658* | (2014.01) |
| *H01M 10/6595* | (2014.01) |
| *H01M 16/00* | (2006.01) |
| *H01M 50/24* | (2021.01) |
| *H01M 50/30* | (2021.01) |
| *H01M 50/409* | (2021.01) |
| *H01M 50/60* | (2021.01) |

(52) U.S. Cl.
CPC ........... *H01M 4/623* (2013.01); *H01M 4/667* (2013.01); *H01M 10/02* (2013.01); *H01M 10/054* (2013.01); *H01M 10/441* (2013.01); *H01M 10/46* (2013.01); *H01M 10/615* (2015.04); *H01M 10/6571* (2015.04); *H01M 10/658* (2015.04); *H01M 10/6595* (2015.04); *H01M 16/006* (2013.01); *H01M 50/24* (2021.01); *H01M 50/394* (2021.01); *H01M 50/409* (2021.01); *H01M 50/60* (2021.01)

(58) Field of Classification Search
CPC .. H01M 10/02; H01M 10/054; H01M 10/441; H01M 10/46; H01M 50/60; H01M 50/24; H01M 50/394; H01M 50/409; H01M 4/0404; H01M 4/045; H01M 4/623; H01M 4/667
See application file for complete search history.

(56) References Cited

U.S. PATENT DOCUMENTS

| | | |
|---|---|---|
| 5,677,075 A | 10/1997 | Fujita |
| 6,187,475 B1 | 2/2001 | Oh et al. |
| 10,615,469 B2 | 4/2020 | Takebayashi |
| 2005/0123814 A1* | 6/2005 | Calhoon ........... H01M 8/04037 429/432 |
| 2008/0026264 A1* | 1/2008 | Watanabe ............. H01M 8/249 429/444 |
| 2008/0050644 A1 | 2/2008 | Christensen et al. |
| 2014/0047707 A1 | 2/2014 | Zhang et al. |
| 2014/0272483 A1* | 9/2014 | Pham ................ H01M 8/04186 429/51 |
| 2015/0044564 A1 | 2/2015 | Wang et al. |
| 2015/0228991 A1* | 8/2015 | Friesen ............... H01M 10/448 320/134 |
| 2015/0244031 A1 | 8/2015 | Adamson et al. |
| 2015/0258897 A1* | 9/2015 | Okada .................. B60L 3/0046 318/376 |

FOREIGN PATENT DOCUMENTS

| | | | | |
|---|---|---|---|---|
| CN | 106025407 B | | 1/2019 | |
| CN | 109585881 A | * | 4/2019 | ........ H01M 8/04186 |
| JP | 2006107864 A | | 4/2006 | |
| JP | 2018092748 A | | 6/2018 | |
| KR | 1020130040300 A | | 4/2013 | |

OTHER PUBLICATIONS

Goojin Jeong et al., "Prospective materials and applications for Li secondary batteries", Energy Environment Science (RSC Publishing) 2011, 4, 1986-2002 DOI 10.1039 C0EE00831A, Apr. 15, 2011, 46 pages.

Transmittal with International Search Report and Written Opinion for application No. PCT/US2020/060040, mailing date Apr. 1, 2021, 11 pages.

* cited by examiner

Charging $Zn$ → $Zn^{2+}$ → $Zn^{2+}$ $Mn^{2+}$ $Zn$         $Zn_xMnO_2$

Cathode Reaction:
Work Reaction: $Zn_xMnO_2 \longrightarrow xZn^{2+} + MnO_2 + 2xe^-$
$H_yMnO_2 \longrightarrow yH^+ + MnO_2 + ye^-$
Healing Reaction: $Mn^{2+} + 2H_2O \longrightarrow MnO_2 + 4H^+ + 2e^-$

Anode Reaction
$Zn^{2+} + 2e^- \longrightarrow Zn$

Discharging $Zn$ → $Zn^{2+}$ → $Zn^{2+}$
$H^+$ $Mn^{4+}$ → $Mn^{3+}$ $Zn$         $MnO_2$

Cathode Reaction
$xZn^{2+} + MnO_2 + 2xe^- \longrightarrow Zn_xMnO_2$
$yH^+ + MnO_2 + ye^- \longrightarrow H_yMnO_2$

Anode Reaction
$Zn \longrightarrow Zn^{2+} + 2e^-$

FIG. 1

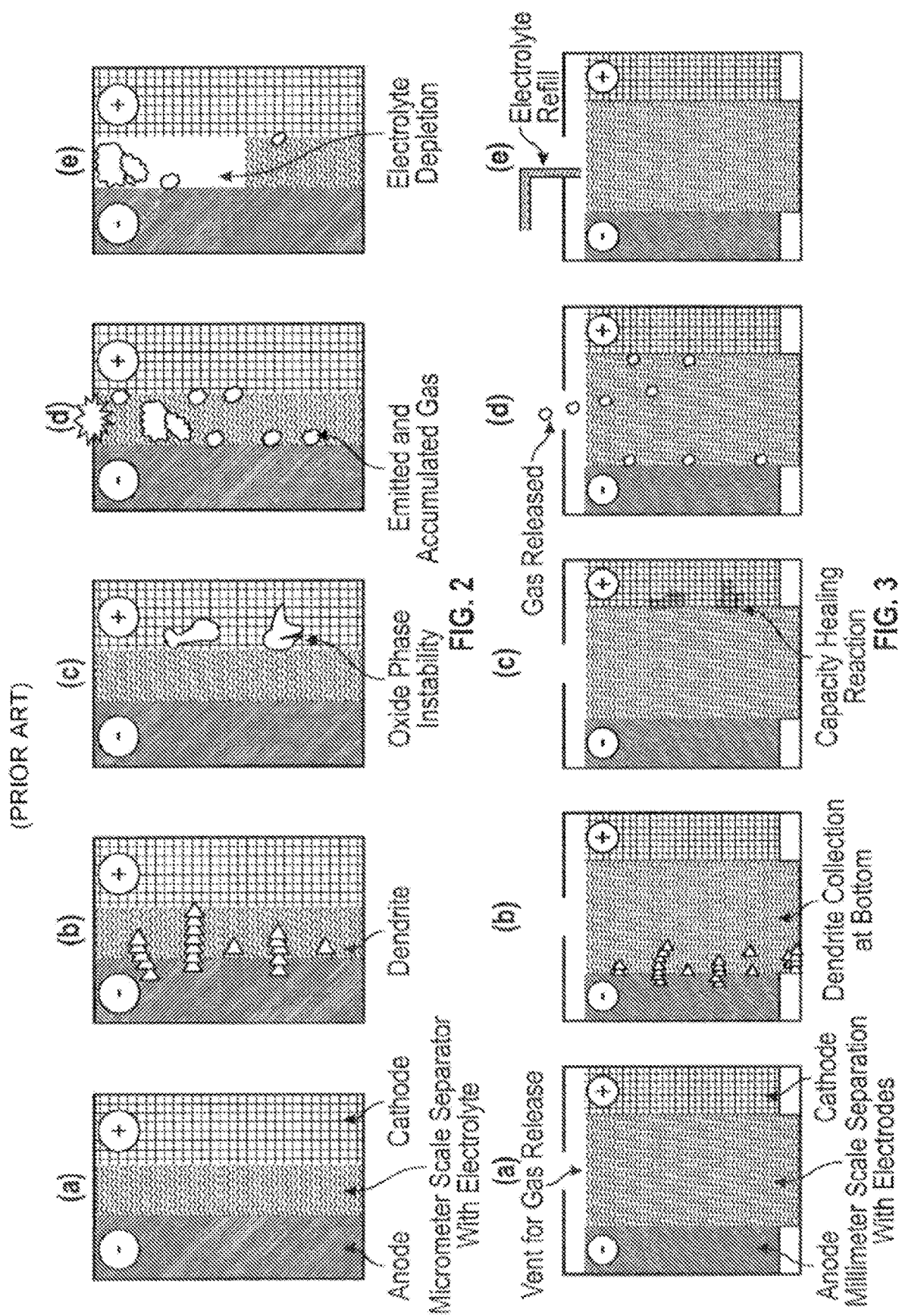

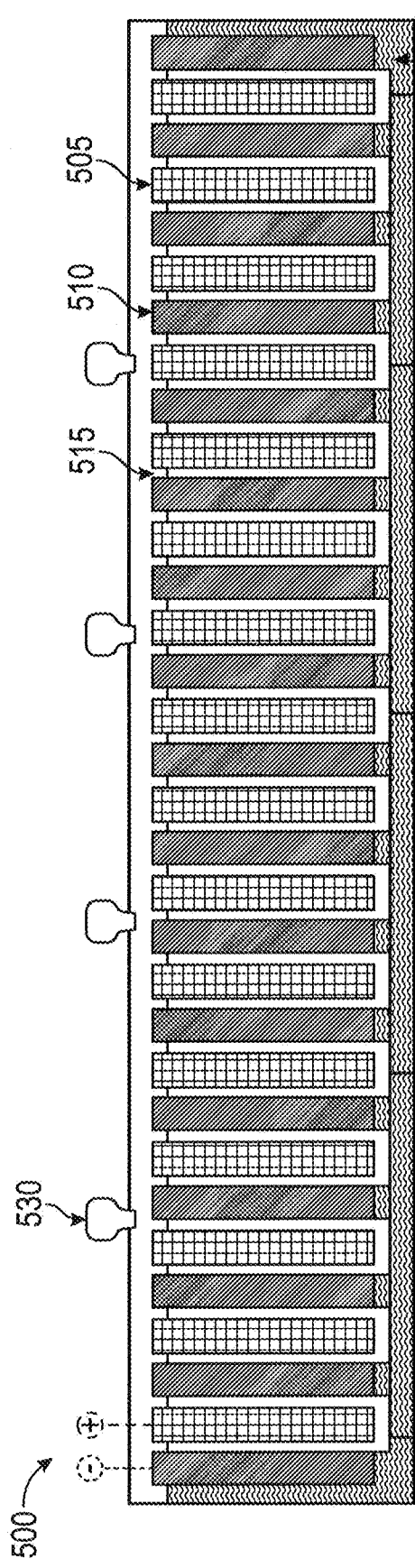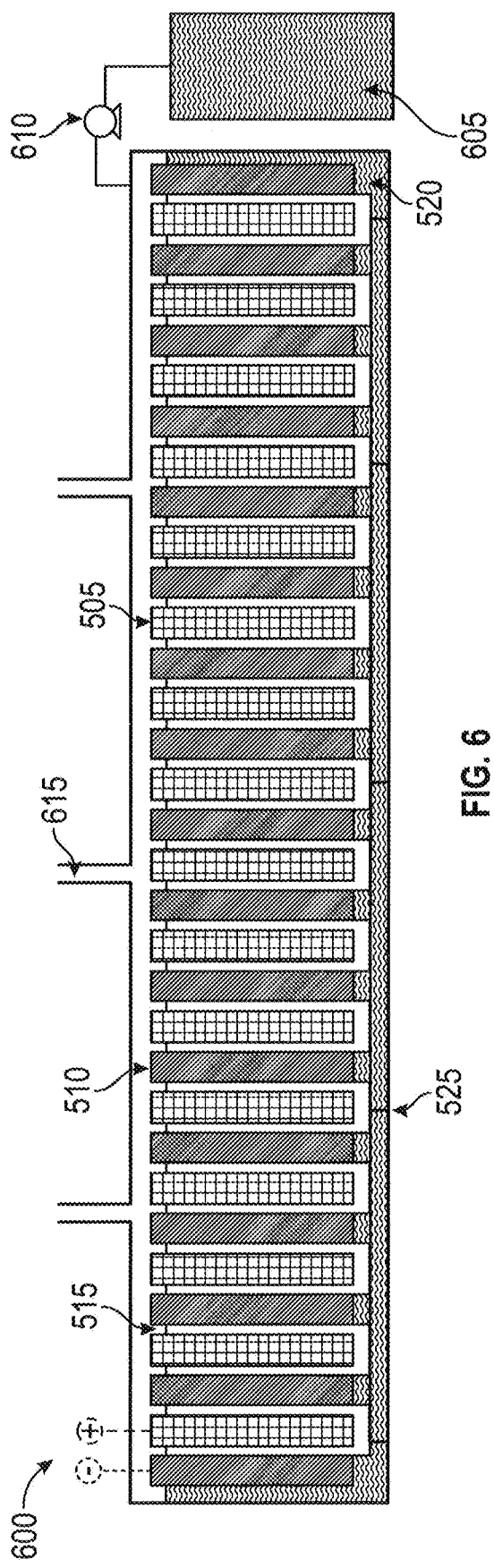

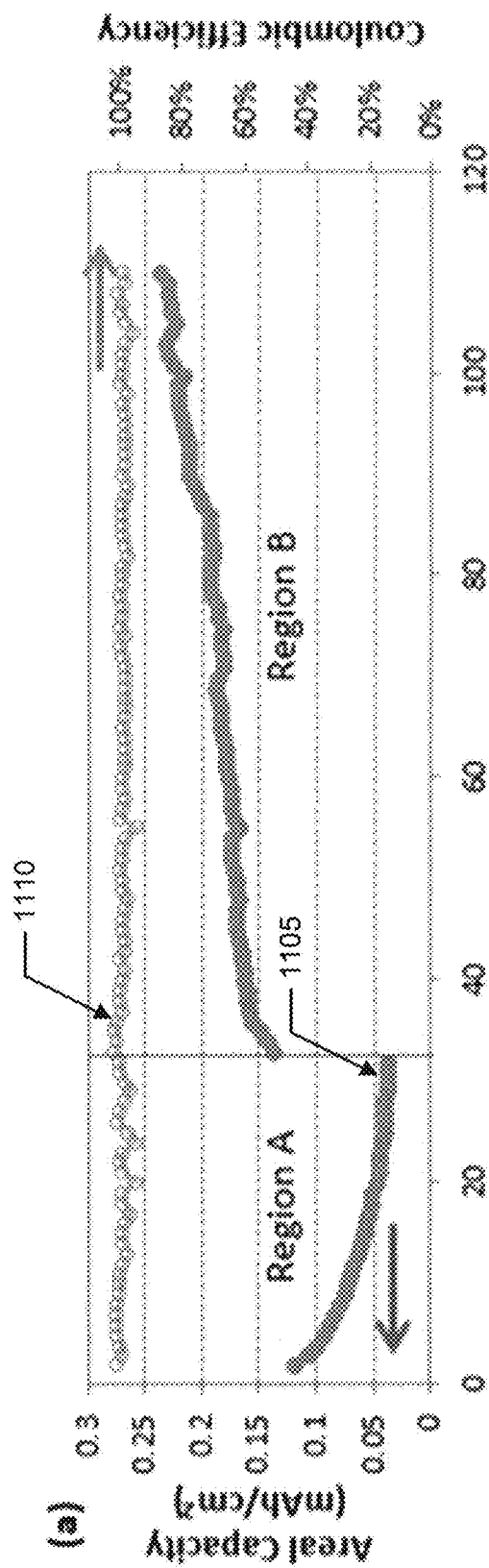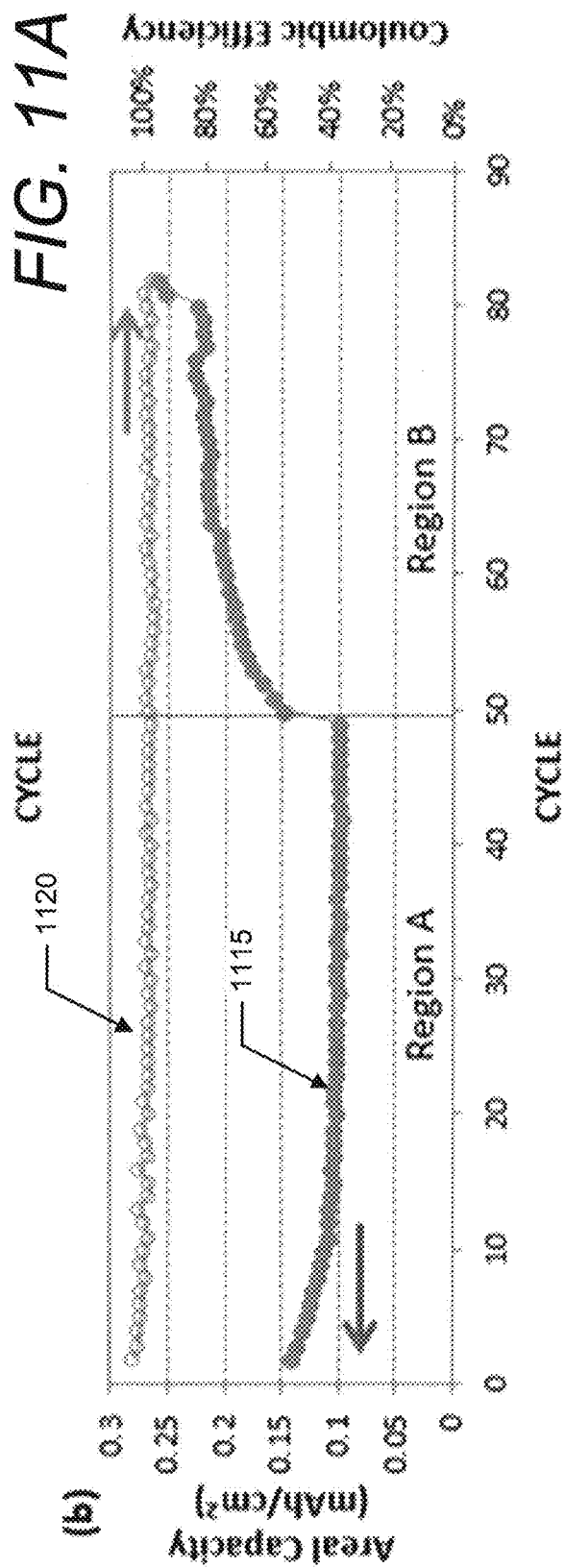

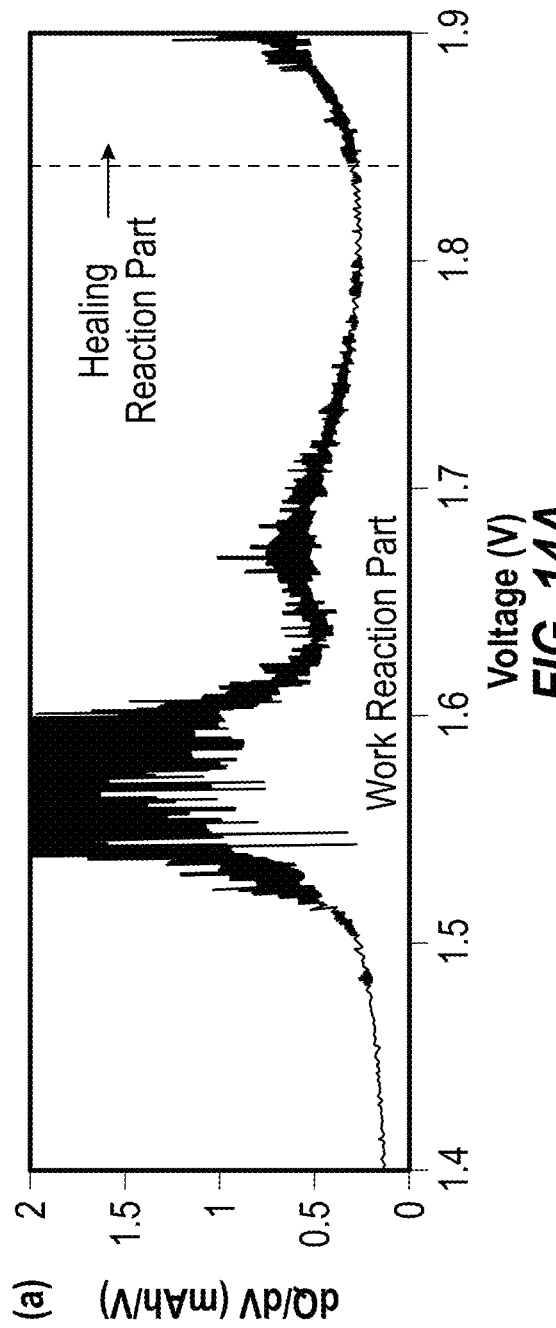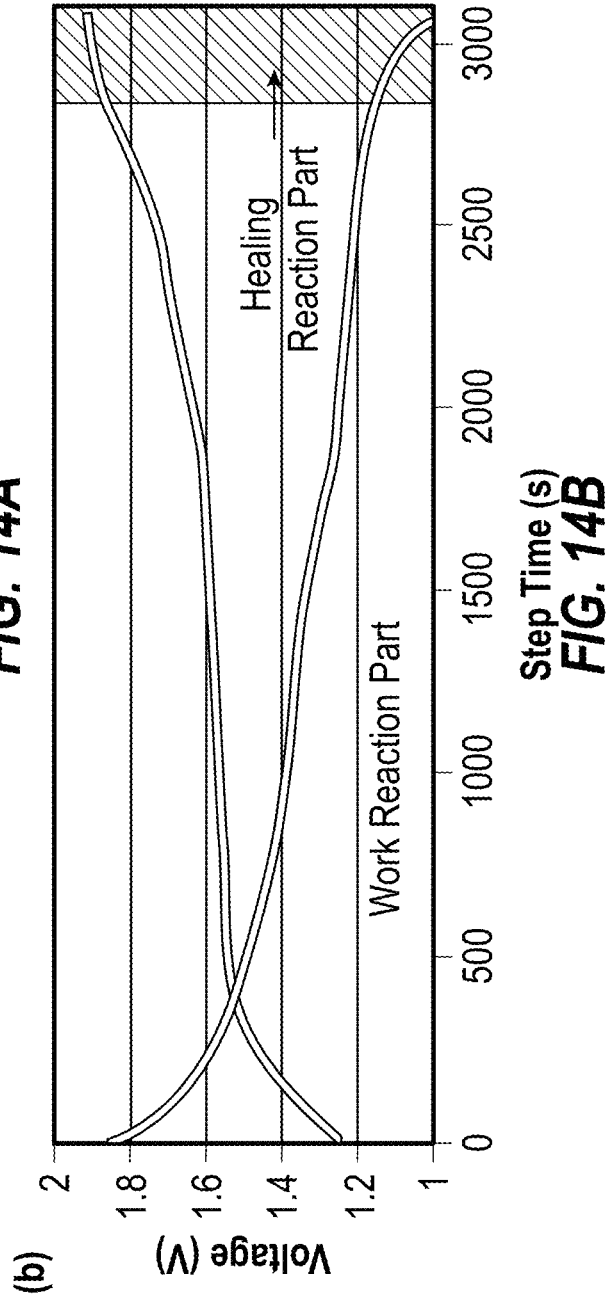
FIG. 14A
FIG. 14B

CAPACITY REGENERABLE EXCESS ELECTROLYTE Zn ION BATTERY

CROSS-REFERENCE TO RELATED APPLICATION

This application is a continuation of U.S. patent application Ser. No. 17/001,300 filed Aug. 24, 2020 entitled "Electrolyte Flooded Zn Ion Battery" by Fantai Kong, Mark Griffin, and Jin-Myoung Lim, which, in turn, claims priority to U.S. Provisional Application No. 62/934,314 filed Nov. 12, 2019 entitled "Electrolyte Flooded Zn Ion Battery" by Fantai Kong, Mark Griffin, and Jin-Myoung Lim.

TECHNICAL FIELD

This invention relates to energy storage devices and electrical storage in general.

BACKGROUND

Renewable energy sources such as wind and solar are becoming much more prevalent in the supply of electrical power to transmission grids. Their variable nature has created electrical transmission grid management problems and crippling downward pricing pressure on renewable power generators. Large scale storage is a potential solution to these problems, but the scale and attendant costs are enormous. As an example, in a single hour, one wind turbine can fully charge ten of the largest capacity electric automobile battery piles available today. These piles represent over ten tons of highly engineered and expensive materials for merely one hour of electric service.

There are many proposed options for grid scale energy storage: however, intensive cost for materials and engineering have so far prevented widespread application of many of these proposed storage solutions. As the dominate option for grid scale energy storage, Li ion battery has been applied in megawatt and gigawatt scale. However, Li ion battery has high materials cost, growing safety concern upon scaling up and complex battery packaging and management. These lead to high cost for wide application in rapidly growing wind farm, solar farm and electricity distribution stations. In addition, high performed Li ion battery require resource limited elements such as Li, Ni and Co. And more importantly, Li ion battery is composed of flammable organic electrolyte which could cause fire when short circuit happening due to preexisting defect and external forces. The possibility of fire accident will rapidly increase when thousands to millions of single Li ion battery cells are integrated to generate mega to gigawatt energy storage. The solution to overcome such safety problem is usage of aqueous electrolyte and earth abundant elements as electrode materials which are not only inflammable but also leading to lower battery cost. Among different types of electrode materials, zinc, manganese oxides, together with proton, are especially attractive due to the abundance of zinc, proton and manganese elements. The price for zinc is around $2/kg and $MnO_2$ is only $1/kg which lead to low energy cost below $10/kWh. However, Zn—MnO2 system is shown to be very nonstable upon battery charge/discharge cycling due to both zinc dendrite growth and $MnO_2$ phase instability. On the other hand, aqueous electrolyte brings in zinc dendrite growth, gas accumulation and electrolyte loss from water electrolysis that inhibit its final commercialization. This patent describes the innovated zinc ion battery with a two-reaction mechanism stabilized system which is enabled by the electrolyte excess open battery configuration. Sustainable and controllable capacity healing reaction is achieved to realize continuous capacity regeneration and leads to high battery stability.

BRIEF DESCRIPTION OF THE DRAWINGS

FIG. 1 is the illustration of the two-reaction mechanism in metal ion battery system during charging and discharging processes. The two reactions compose one work reaction with cations or anions as charge carrier and one capacity healing reaction for capacity regeneration. The concept is illustrated using Zn metal anode and $MnO_2$ cathode as the example, and charge carriers for work reaction consists both zinc ion and proton ($H^+$).

FIG. 2 shows the challenges of conventional zinc ion battery. (a) Conventional zinc ion battery device configuration with confined/sealed space and micrometer scale thickness of separator. The electrolyte is filled into the separator. And the challenges faced by this type of battery device: (b) The low tolerance of dendrite growth due to micrometer distance between electrodes and the resulted short-circuit. (c) Oxide phase instability upon metal ion intercalation with battery cycling. (d) Gas evolution and accumulation leads to pressure increment and cell explosion. (e) The depletion of electrolyte due to electrolysis and gas accumulation.

FIG. 3 shows the advantages of invented zinc ion battery, with (a) Invented zinc ion battery device with open configuration (vent connection to outside and millimeter scale distance between electrodes). The electrolyte is filled into the space between electrodes. (b) The higher tolerance of dendrite growth due to millimeter distance between electrodes and the dendrite collection at bottom of battery case. (c) Capacity healing reaction applied to regenerate the lost capacity due to oxide instability. (d) Gas evolution and venting lead to pressure release thus higher safety. (e) The depletion of electrolyte can be compensated with external electrolyte refill through the pre-designed port.

FIG. 5 is a diagram showing an example configuration of grid-scale excess electrolyte Zn ion battery with catalyst for gas recombination.

FIG. 6 is a diagram showing an example configuration of grid-scale excess electrolyte Zn ion battery with electrolyte reservoir tank and venting system.

FIGS. 11A and 11B are plots of areal capacity and columbic efficiency versus cycles of an example of how capacity regeneration is controlled through modifying cut-off charging voltage.

FIG. 14A is a plot of the dQ/dV relation to voltage during charging process where Q represents charging capacity. FIG. 14B is a plot of the voltage applied to work reaction and regeneration (regen) reaction during one cycle.

Figure 4B:
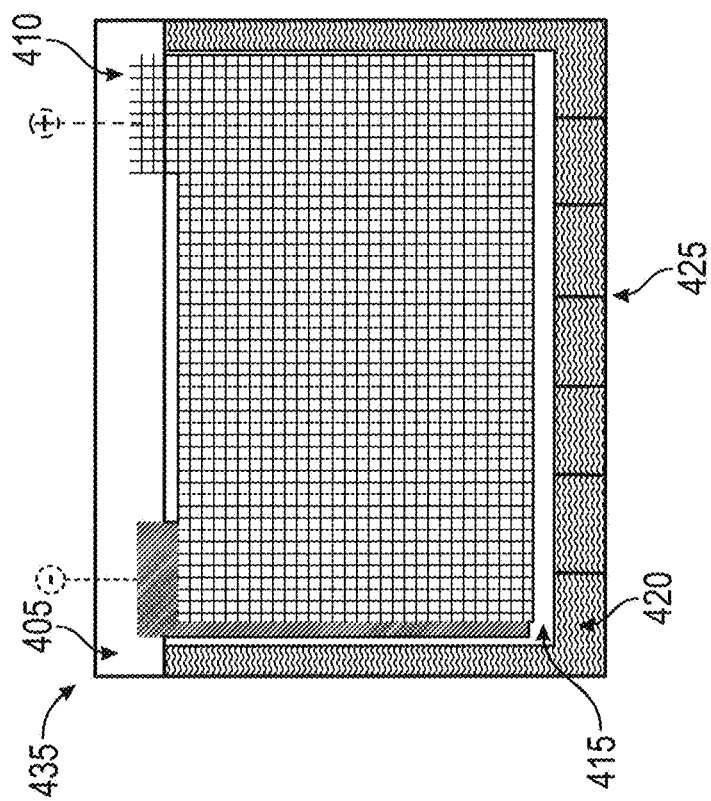
FIGS. 4A and 4B are diagrams of an example configuration of portable-scale excess electrolyte Zn ion battery.

While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

SUMMARY

Example embodiments include a Zn ion battery configured for portable-scale and grid-scale energy storage.

Example embodiments include a Zn ion battery configuration integrating catalyst for gas recombination.

Example embodiments include a battery system with electrolyte and solvent reservoir system.

Example embodiments include a battery system with gas collection system.

Example embodiments include a battery system integrating with fuel cells.

Example embodiments include a battery system integrating with system to control the temperature.

Example embodiments include an electrolyte excess battery design with applied healing reaction for capacity regeneration.

Example embodiments include an electrolyte excess battery design for sustainable and controllable capacity regeneration.

Example embodiments include a method for controlling capacity regeneration in battery system including modifying battery operation voltage.

Example embodiments include a method for controlling capacity regeneration in battery system including modifying electrolyte salt concentrations Example embodiments include a method for controlling capacity regeneration in battery system including modifying current density or current rate.

Example embodiments include a method for controlling capacity regeneration in battery system at a plurality of temperatures.

Example embodiments include a method for in-situ battery fabrication through in-situ capacity regeneration.

Example embodiments include a method for in-situ battery regeneration through in-situ electrode etching and in-situ capacity regeneration.

Example embodiments include a method for battery recycling at the end of life.

DETAILED DESCRIPTION

Certain example batteries and system include an aqueous Zn ion battery for grid-scale energy storage technology. This battery may provide one or more advantages including one or more of high energy density, low materials cost, environmentally benign chemistry, safe aqueous electrolyte, ambient manufacturing condition, etc. The two-reaction mechanism with one additional healing reaction to regenerate capacity is introduced to Zn ion battery system. This two-reaction mechanism is described as following by using Zn—MnO2 system as the example. Zn ion battery using manganese oxides as the cathode materials following work reactions on cathode side: $xZn^{2+}+MnO^{2+}2xe^-\leftrightarrow Zn_xMnO_2$, $yH^++MnO_2+ye^-\leftrightarrow H_yMnO_2$; and on anode side: $Zn\leftrightarrow Zn^{2+}+2e^-$. Embodiments of the system are designed to be acidic with PH values ranging from 0 to 6 so that active protons are introduced as charge carriers for improved kinetics and capacity. With Zn ion and proton intercalated into MnO2 structure on the cathode side, stripping of Zn ion happens on the anode side. The charge is carried by $Zn^{2+}$ and proton in the acidic electrolyte containing Zn cations. However, Zn intercalation into MnO2 induces stability challenge and leads to continuous materials degradation. A second reaction which may be referred to as a "healing reaction" is therefore included into the system to regenerate the capacity loss due to materials structure degradation. This healing reaction using MnO2 as the example is expressed as: $Mn^{2+}+2H_2O\rightarrow MnO_2+4H^++2e^-$. The regenerated MnO2 will act as fresh host materials to supply extra capacity and compensate the loss from MnO2 degradation. The healing reaction is enabled with sustainable $Mn^{2+}$ cation in the electrolyte. Through this two-reaction mechanism, a high cycling stability can be obtained. The mechanism using Zn—MnO2 system as the example has been illustrated in FIG. 1. However, the applied healing reaction in Zn—MnO2 battery consumes $H_2O$ from the electrolyte, thus over long term cycling, as may be required for grid-scale energy storage, the depletion of electrolyte will be accelerated. This will result in non-sustainable healing effect and deteriorated battery capacity degradation in conventional sealed battery configurations such as AA cylinder, coin cell and pouch cell. Therefore, an open battery configuration with excess electrolyte is disclosed for this two-reaction mechanism-based Zinc ion battery. Excess and refillable electrolyte provide for sustainability and controllability of the healing reaction, which, in turn, provides stable battery performance. The open configuration will be more detailed described in the following.

Moreover, certain example Zn ion batteries with sealed configuration may be inhibited by gas evolution and metal dendrite growth. Thermodynamically, an aqueous system has a water electrolysis window of 1.23 V, higher than which the gas evolution reaction due to $H_2O$ splitting into $H_2$ and $O_2$. most Zn ion chemistry requires voltages higher than 1.23 V, indicating unavoidable water electrolysis. Such electrolysis reactions are more facilitated at reduce current rate as widely used by renewable energy storage applications. In general, grid-scale energy storage system requires lifetime of over 7000 cycles. Accumulation of these gases may lead to serious safety concern since cell pressure buildup could trigger battery cell explosion. Water electrolysis also leads to electrolyte loss and results in poor cycling stability. Also, increased ambient temperature, reduced current density and reduced PH value all promote such electrolysis reaction. Secondly, Zinc has a notorious problem of dendrite growth during long-term cycling. When Zn dendrite penetrates the separator between cathode and anode, a short circuit will happen and destroy the battery cell with large amount of heat generation and fast capacity degradation. As shown in FIG. 2, conventional developed Zn ion battery all adopts sealed battery device configurations, and the space between electrode is in micrometers scale due to applied pressure for good sealing, and this leads to low tolerance of dendrite growth, gas explosion and electrolyte depletion. One method for combatting these effects is highly concentrated electrolyte (10M to 20M mole concentration) to suppress water electrolysis which however may use electrolytes such as $Zn(TFSI)_2$ and $Zn(CF_3SO_3)_2$, which may be expensive. The difficulty of scaling up these batteries may limit their practical application in grid-scale energy storage. Methods like Zn foam or Zn deposition on carbon nanotube may help to suppress dendrite growth, which increases the electrode manufacturing cost and difficulty of scaling up production, thus inhibits the commercialization. A novel strategy that can accommodate easy scaling up materials and fabrication method enables further commercialization of Zn ion battery.

Example batteries and battery systems may be different from conventional sealed battery configuration, such as AA cylinder, coin cell and pouch cell. Example embodiments include an open battery device configuration for Zn ion battery. The open battery device configuration shows many advantages over sealed one. As shown in FIG. 3, the distance between electrode can be easily tuned to reach millimeter scale, that is 100 to 1000 times larger than micrometer scale for sealed battery. In certain example embodiments, the spacing between electrodes is between 1 mm and 5 mm. In certain example embodiments, the spacing between electrodes is 0.1 mm, 0.2 mm., 0.3 mm, 0.4 mm., 0.5 mm, 0.6 mm, 0.7 mm, 0.8 mm, 0.9 mm, 1 mm, 1.1 mm, 1.2 mm, 1.3 mm, 1.4 mm, 1.5 mm, 1.6 mm, 1.7 mm, 1.8 mm, 1.9 mm, 2 mm, 2.1 mm, 2.2 mm, 2.3 mm, 2.4 mm, 2.5 mm, 2.6 mm, 2.7 mm, 2.8 mm, 2.9 mm, 3 mm, 3.1 mm, 3.2 mm, 3.3 mm, 3.4 mm, 3.5 mm, 3.6 mm, 3.7 mm, 3.8 mm, 4.9 mm, 4 mm, 4.1 mm, 4.2 mm, 4.3 mm, 4.4 mm, 4.5 mm, 4.6 mm, 4.7 mm, 4.8 mm, 4.9 mm, 5 mm, 5.1, mm, 5.2 mm, 5.3 mm, 5.4 mm, 5.5 mm, 5.6 mm, 5.7 mm, 5.8 mm, 5.9 mm. 6 mm, 6.1 mm, 6.2 mm, 6.3 mm, 6.4 mm, 6.5 mm, 6.6 mm, 6.7 mm, 6.8 mm, 6.9 mm, 7 mm, 7.1 mm, 7.2 mm, 7.3 mm, 7.4 mm, 7.5 mm, 7.6 mm, 7.7 mm, 7.8 mm, 7.9 mm, 8 mm, 8.1 mm, 8.2 mm, 8.3 mm, 8.4 mm, 8.5 mm, 8.6 mm, 8.7 mm, 8.8 mm, 8.9 mm, 9 mm, 9.1 mm, 9.2 mm, 9.3 mm, 9.4 mm, 9.5 mm, 9.6 mm, 9.7 mm, 9.8 mm, 9.9 mm, 10 mm. The actual spacing between electrodes may be "about" the spacings specified above based on the variances and tolerances of the materials and construction techniques. In certain embodiments, the spacing between electrodes may be uniform. In other example embodiments, the spacing between electrodes may vary. The increased distance largely increased the tolerance of the battery to dendrite growth. For dendrite debris that fall off, a space below separator can be designed to collect fallen dendrite. Increased space also permits excess electrolyte being filled into the system. The excess electrolyte helps sustain the healing reaction which consumes electrolyte salt and solution as described above, thus elongate the cycling life. Excess electrolyte can be realized through filling flooded electrolyte, or soaked electrolyte by porous or gel-state separator. The vent at the top of case helps release the gas due to water electrolysis to avoid the gas accumulation and resulted battery exploration. This greatly increases the safety of the battery device. Moreover, open system can easily integrate with electrolyte refill system that depleted water or salt can be compensated by external control system to maintain stability.

In example embodiments of the battery and system, the plate-type cathode and anode are separated by a spacer or separator, composed of filter paper, fiberglass paper, fiber cloths, polyethylene separator, plastic mesh and their combinations. The current collectors may use carbon paper, carbon cloth, carbon felt, carbon foil, carbon foam, conductive polymers, metal sheet, metal mesh, metal foam, wherein metal includes zinc, nickel, carbon steel, chromium, copper, aluminum, stainless steel, and their combinations. Furthermore, they may be coated with electrically conductive materials, such as carbon black, conductive graphite, carbon nanotube, activated carbon, amorphous carbon, conductive polymer, metal particle such as zinc, nickel, chromium, copper, aluminum, stainless steel. To obtain good coating effect, the coating materials may mix with polymer binders such as Polyvinylidene fluoride (PVDF), Polytetrafluoroethylene (PTFE), Polyvinyl butyral (PVB), Carboxymethyl cellulose (CMC), Styrene-Butadiene Rubber (SBR), Poly (ethylene oxide) (PEO), in solvents such as N-Methyl-2-Pyrrolidone (NMP), ethanol, acetone, and water. The resulted slurry may be applied onto current collector through methods such as brush painting, spin coating, blade coating, dip-coating to improve electronic conductivity. The cathode electrode materials comprise manganese oxide, nickel oxide, or vanadium oxide. Metal doping such as aluminum, nickel, lead, magnesium, boron, cobalt, titanium, chromium, vanadium can be applied to the cathode materials to modify the performance of electrode. The anode electrode materials could comprise zinc, aluminum, nickel, lead, magnesium, boron, cobalt, titanium, chromium, vanadium, activated carbon, hard carbon, or sodium vanadium phosphate. These electrode materials may dispose on current collector through different kinds of methods: brush painting, spin coating, blade coating, dip-coating, electroplating, pulse electroplating, electrodeposition, constant voltage electrodeposition, constant current electrodeposition, pulse electrodeposition, cyclic voltammetric deposition, and electrophoretic deposition. In example embodiments of the battery and system, electrolyte is filled within the case. The electrolyte comprises solvents such as water and organic solvents, with additive cations such as $Zn^{2+}$, $Mn^{2+}$, proton, $Al^{3+}$, $Na^+$, $K^+$, $Mg^{2+}$, $Ni^{2+}$, $Cu^{2+}$, $Fe^{3+}$, $Co^{2+}$, $Ca^{2+}$, $NH_4^+$, etc., anions such as $PO_4^{3-}$, $SO_4^{2-}$, $CH_3COO-$, $Cl-$, $F-$, $Br-$, $NO_3^-$, etc.

Figure 4A:
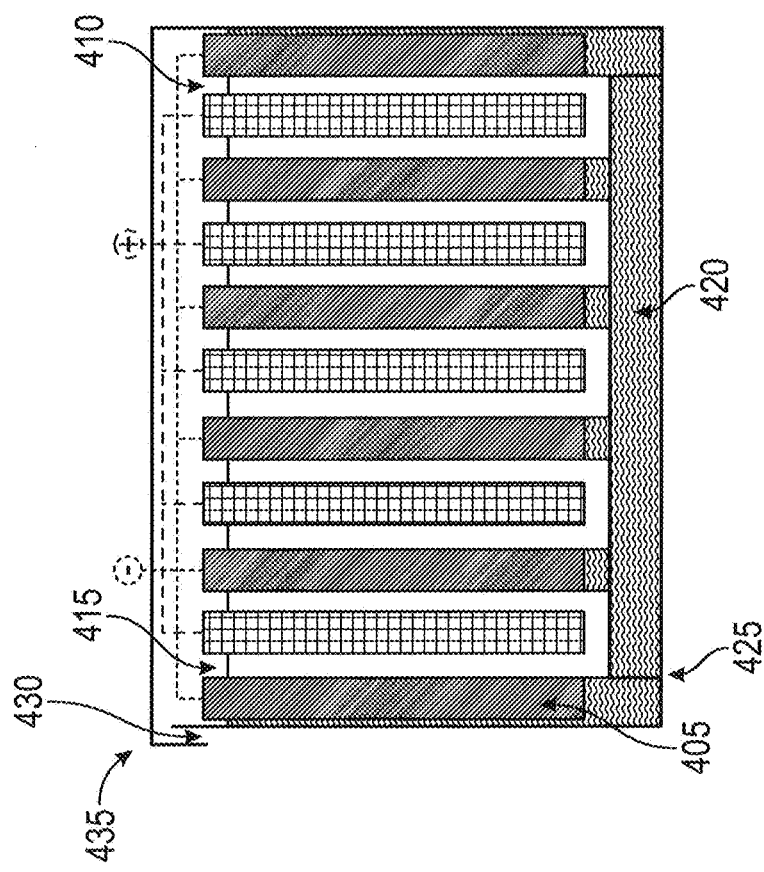

One type of portable-scale battery configuration is shown in FIGS. 4A and 4B. In example embodiments of this battery and system, a set of cells are connected together in parallel to form one battery with average voltage of 1.4 V. These cells can, in turn, be serially connected to obtain the desired output voltage. In example embodiments of the battery and system, the case 430 is made of insulation materials such as polymers with a support frame 425 at the bottom to provide electrode mechanical support. In example embodiments of the battery and system, the support frame 425 also functions as dendrite debris collector. In example embodiments of the battery and system, cathode 405 and anode 410 are separated by separator 415. In certain example embodiments, the separator 415 is composed of one or more of filter paper, fiberglass paper, fiber cloths, polyethylene separator, cellulose, wood fibers, plastic mesh and combinations of these materials. The battery system further includes an electrolyte 420. In example embodiments of the battery and system, there is a gas vent port 435 on the top of the case 430 to, for example, release accumulated pressure due to water electrolysis, and current collecting wires to both cathode and anode. In example embodiments of the battery and system, the current collecting wires are connected with external circuit and battery control system.

Several example types of grid-scale battery configurations are shown in FIGS. 5 to 9. FIG. 5 is an example battery system 505. Battery system 505 includes cathodes 505 and anodes 510, separated by separator 515. The battery system 500 is filled with an electrolyte 520. The base of battery system 500 includes an electrode support and dendrite collector 525. The battery system 500 further includes a catalyst cap 530 that, for example, enables recombination of $H_2$ and $O_2$ from water electrolysis. In certain example embodiments, the catalyst in the catalyst cap 530 is composed of one or more of platinum, palladium, carbon, and metal oxides. Battery system 505 includes a battery system controller. Battery system controller is configured to control the charging and discharging of the battery system. Battery system control may measure the voltage of the battery system and determine if the battery is system is at a capacity regeneration voltage threshold. If the battery system is not at the capacity regeneration voltage threshold, then the battery system controller may selectively charge and discharge the battery at a normal cutoff voltage. In certain example embodiments, the normal cutoff voltage is around 1.7 V. In other example embodiments, the normal cutoff voltage is around 1.8 V. If the capacity regeneration voltage has been met, then the battery system controller will cause the battery to perform a healing reaction. In certain example embodiments, the battery system controller causes the healing reaction by controlling the battery to charge and discharge at a capacity regeneration cutoff voltage that is above the normal cutoff voltage. The healing reaction may provide active electrode materials in the battery. In certain example embodiments, the capacity regeneration cutoff voltage is at or above 1.9 V. In certain example embodiments, the capacity regeneration cutoff voltage is at or above 1.95 V, 2.0V, 2.1 V, 2.2V, 2.3V, 2.4V, 2.5V, 2.6V, 2.7V, or 2.8V. As will be discussed in example below, the battery system controller may further control the battery system to improve capacity in a healing reaction by altering the salt concentrations of the electrolyte 520. In other example embodiments, the battery system controller may further control the battery system to improve capacity in a healing reaction by altering the temperature of the battery. In other example embodiments, the battery system controller may further control the battery system to improve capacity in a healing reaction by altering the current density. The current density applied for example controlling healing reaction is 10 mA/g, 20 mA/g, 30 mA/g, 40 mA/g, 50 mA/g, 60 mA/g, 70 mA/g, 80 mA/g, 90 mA/g, 100 mA/g, 110 mA/g, 120 mA/g, 130 mA/g, 140 mA/g, 150 mA/g, 160 mA/g, 170 mA/g, 180 mA/g, 190 mA/g, 200 mA/g, 210 mA/g, 220 mA/g, 230 mA/g, 240 mA/g, 250 mA/g, 260 mA/g, 270 mA/g, 280 mA/g, 290 mA/g, 300 mA/g, in which the gram refers to the weight of active cathode materials. In other example embodiments, the battery system controller may further control the battery system to improve capacity in a healing reaction by controlling the ratio and type of electrolyte ions. For the $Zn$—$MnO_2$ case, example ratio of Zn ion concentration to Mn ion concentration in electrolyte may be in a range from 20 to 0.5, and in certain embodiments may be 20, 19, 18, 17, 16, 15, 14, 13, 12, 11, 10, 9, 8, 7, 6, 5, 4, 3, 2, 1, 0.9, 0.8, 0.7, 0.6, or 0.5.

Although the battery system controller has been described with respect to the example embodiment of FIG. 5, each of the battery systems of the present disclosure may include the battery system controller. The battery system controller may further include one or more controllers or processors and memory. The memory includes one or more instructions stored in non-transitory form that, when executed, cause the controllers or processors to perform the operations of the battery system controller. The battery system controller may be coupled to one or more sensors to monitor the operation of the battery system. Example sensors may include sensors to measure one or more of temperature, pressure, PH, liquid level, gas type, ion concentration, voltage, current, or resistivity. The battery system controller may be located at or near the battery system. In other example embodiments, the battery system controller may be remote from the battery system and coupled to the battery system by a data network. In other example embodiments, the battery system controller may control the operations of 2, 3, 4, 5, 6, 7, 8, 9, 10, or more battery system.

FIG. 6 is another example battery system (shown generally as 600) with a configuration including one or more reservoir tank 605 for electrolyte, water, and other solvents to compensate water loss or electrolyte switching for electrode fabrication and etching. The pump and control system 610 are connected with the one or more reservoir tanks 605. This configuration may provide for a self-controlled maintenance-free system. In certain example embodiments, the excess gases from water electrolysis may be vented to avoid pressure accumulation.

Figure 7:
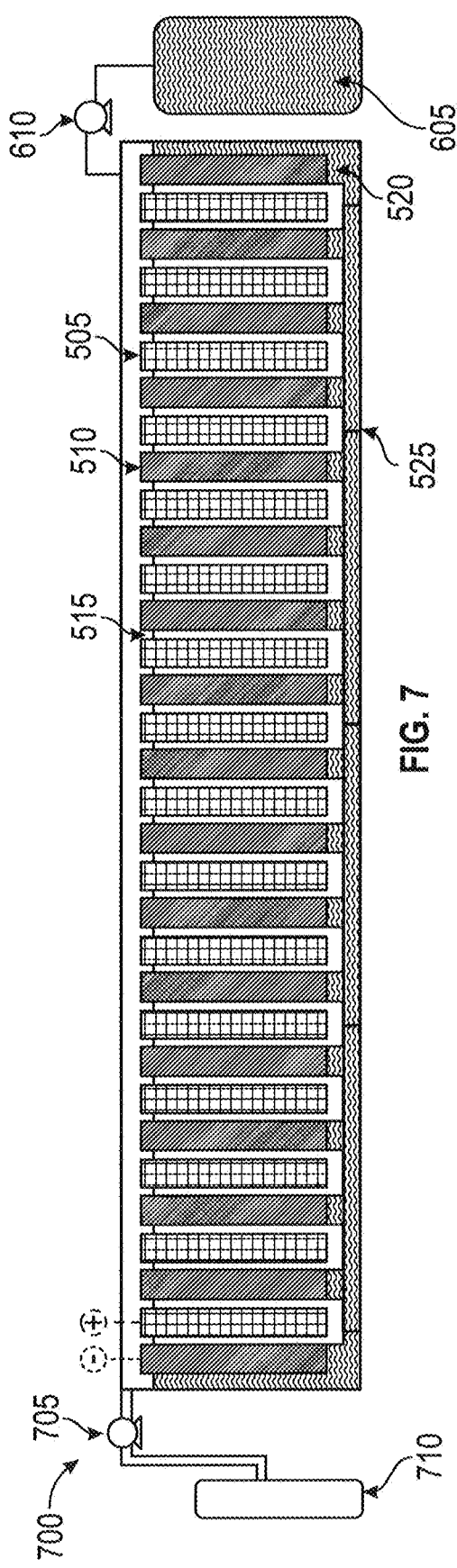
FIG. 7 is a diagram showing an example configuration of grid-scale excess electrolyte Zn ion battery with electrolyte reservoir tank and gas collection system.

FIG. 7 shows an example battery system (shown generally as 700) including a combining gas collection system 705 to replace direct venting. Gas pump 710 and collection tank 715 are used to collect gases. In certain example embodiments, the collected gas is primarily $H_2$ which may be a commercially valuable gas for applications including fuel cells, petroleum refinement, organic chemical synthesis, etc.

Compared with sealed Zn ion battery configuration, the example open battery configurations avoid gas accumulation and increase the safety of the battery systems. Gas management systems can therefore integrate with Zn ion battery to either circulate electrolyzed water or produce commercially valuable hydrogen. These approaches include catalyst to recombine $H_2$ and $O_2$ for internal water circulation, $H_2$ collection for other applications, integration with hydrogen fuel cell for electricity generation and $H_2O$ recombination.

Figure 8:
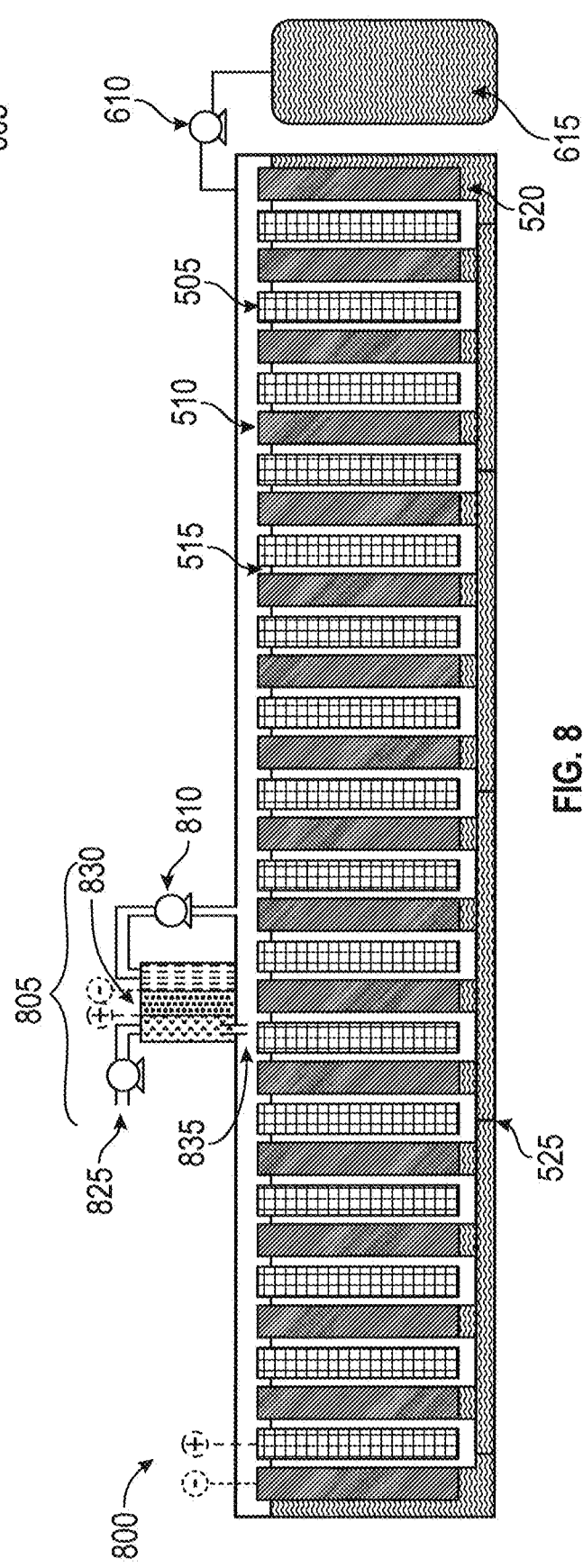
FIG. 8 is a diagram showing an example configuration of grid-scale excess electrolyte Zn ion battery with integrated hydrogen fuel cell system.

FIG. 8 is an example battery system (shown generally as 800) that integrates a hydrogen fuel cell 805. $H_2$ gas from water electrolysis is pumped by a first pump 810 though $H_2$ flow inlet and into the fuel cell anode 820. A second pump 815 on the other side pumps air into the fuel cell cathode 825. A proton exchange membrane 830 sits between two electrodes that $H_2$ splits into proton and migrate to react with $O_2$ in air to generate electricity and $H_2O$. The $H_2O$ will flow back into the battery electrolyte to compensate water electrolysis. This example configuration also combines with electrolyte reservoir system considering the efficiency of fuel cell to recombine $H_2$ and $O_2$ is less than 100%.

Figure 9:
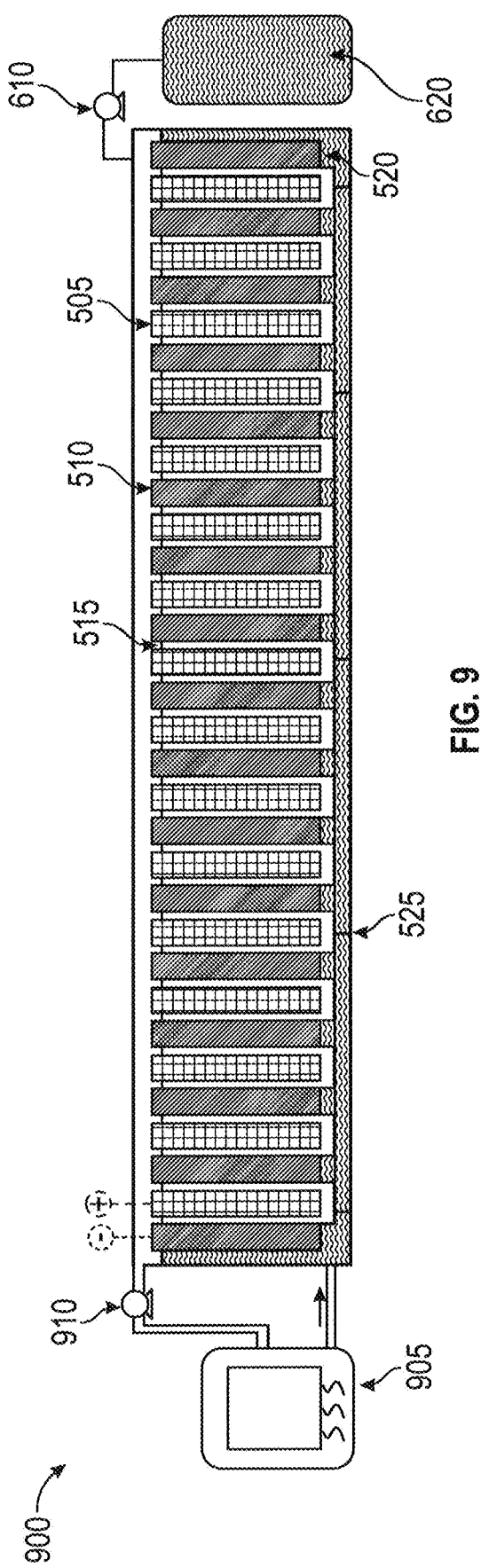
FIG. 9 is a diagram showing an example configuration of grid-scale excess electrolyte Zn ion battery with electrolyte reservoir tank and integrated hydrogen burning system.

FIG. 9 is an example battery system (shown generally as 900) that integrates the gas burning system 905. The electrolyzed gases are collected and burned to generate heat which can assist heating the electrolyte. The electrolyzed gasses are pumped to the gas burning system 905 by pump 910. This electrolyte heating may be beneficial, for example, where certain example battery chemistries have higher kinetics and good stability at elevated temperature. And temperature can be controlled in this way to control different reactions in the system. To achieve temperature control, the battery system 900 may be integrated with a heating circuit around the battery case. In certain embodiments, power to supply heating circuit may come from renewable energy resource, or in combination with power from the battery itself. Further application of thermal insulation materials may be applied to the battery case as well to maintain the temperature of the system. The heat generated by the battery can be retained in this way to help improve temperature thus kinetics of the battery. The thermal insulation materials may comprise of fiberglass, mineral wool, cellulose, rock wool, polystyrene foam, polyurethane foam, vermiculite, perlite, and cork.

The example open battery configuration avoids tight packing structure within electrodes and electrolyte in sealed battery configuration. This may increase the tolerance for Zn metal dendrite growth from micrometers to millimeters, thus thicker separator in millimeter-scale can be applied to increase electrode distance and avoid dendrite penetration. Moreover, in certain example embodiments the dendrite will fall off the electrode when growing to certain length due to gravity. This also helps avoid dendrite penetration through the separator. The dendrite collector at the bottom of the battery could help avoid short circuit from accumulated dendrite debris.

Example open battery configuration may be easier for disassembling and recycling. This effectively reduces the battery recycling cost. The dendrite at the bottom and the electrolyte can be easily collected to reproduce new electrode and electrolyte. The electrode can be easily etched with acid and recollected for battery electrode fabrication.

In example embodiments, the Mn salt additive in electrolyte can have beneficial healing reaction with cathode materials to regenerate the lost capacity. But this effect consumes electrolyte and thus not sustainable in conventional sealed type battery. In certain example implementations, this limits its application for grid scale energy storage which requires service time of more than 20 years. Example disclosed battery system configurations could make such effect sustainable. This type of excess electrolyte permits sustainable healing reactions between electrolyte salts and electrode materials that help improve the battery performance. Some performance data are shown in the following figures.

Through control of voltage, current density, electrolyte additive concentration and types, the sustainable healing reaction induced capacity regeneration can be controlled with excess electrolyte. This may permit durable cycling performance. In certain embodiment with flooded electrolyte design and voltage control, example batteries may provide increased stability tolerance at elevated temperatures, for example at or above 40° C.

In certain embodiments, the chemicals and fabrication methods applied are commercially available and easy for scaling up. This leads to low cost battery.

As described above, one example application of a battery configuration and the integrated two-reaction mechanism battery system is an aqueous Zn ion battery, but the methods can be applied to other aqueous and non-aqueous battery systems like Li ion battery, Na ion battery, proton battery, Mg ion battery, Al ion battery, Ni ion battery, Cu ion battery, Ca ion battery, Zn air battery, Mg air battery, Al air battery, Ni air battery, Cu air battery, Ca air battery, Pb acid battery.

Example products includes portable-scale aqueous battery for motorcycles, trucks, as a substitution to lead acid batteries. It also includes grid-scale energy storage system that integrate with a battery management system and solar/wind farm as energy input resources.

Figures 10A, 10B:
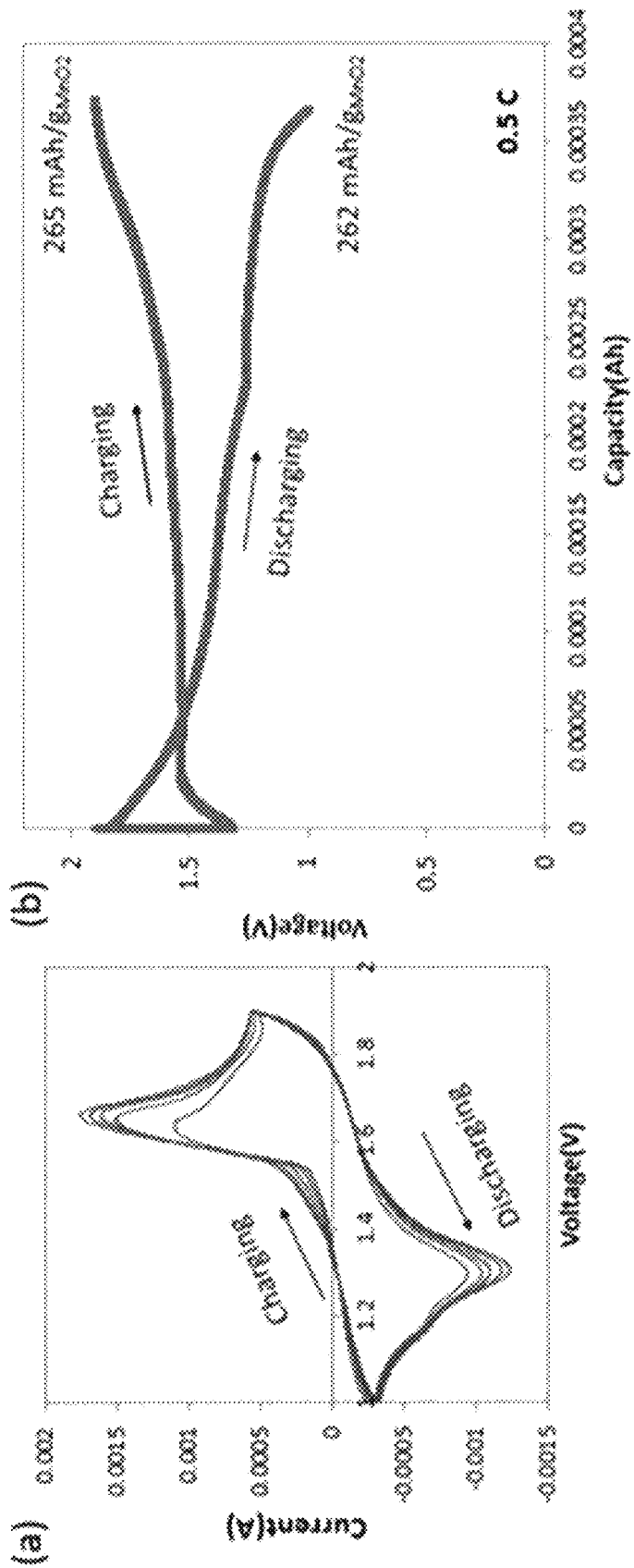
FIG. 10A is a plot of an example current-voltage profile with scanning rate of 1 mV/s.
FIG. 10B is a plot of an example voltage-capacity profile of an electrolyte flooded Zn ion battery at 0.5 C. The weight is based on mass of MnO2. Discharging process involves intercalation of proton and zinc ion into MnO2 cathode host sites, and charging process has both proton and zinc ion extracted out of MnO2.

FIGS. 10A and 10B show the basic performance of a Zn ion battery with metallic Zn as anode, MnO2 as cathode and zinc ion and proton as charge carriers. FIG. 10A is the current voltage profile which shows the main charging and discharging redox peaks are 1.6 V and 1.3 V respectively. Note that the discharging curve has two redox peaks with one main peak at 1.3 V and a secondary peak at around 1.2 V. These two peaks are assigned to different kinetics from proton and zinc ion charge carriers. FIG. 10B is the voltage capacity profile showing the specific capacity of about 260 mAh/g at 0.5 C. The discharge curve shows a turning point at around (0.23 mAh, 1.22 V). This turning point is from different kinetics and proves the mixture of proton and zinc ion intercalation into $MnO_2$ cathode.

Figure 12:
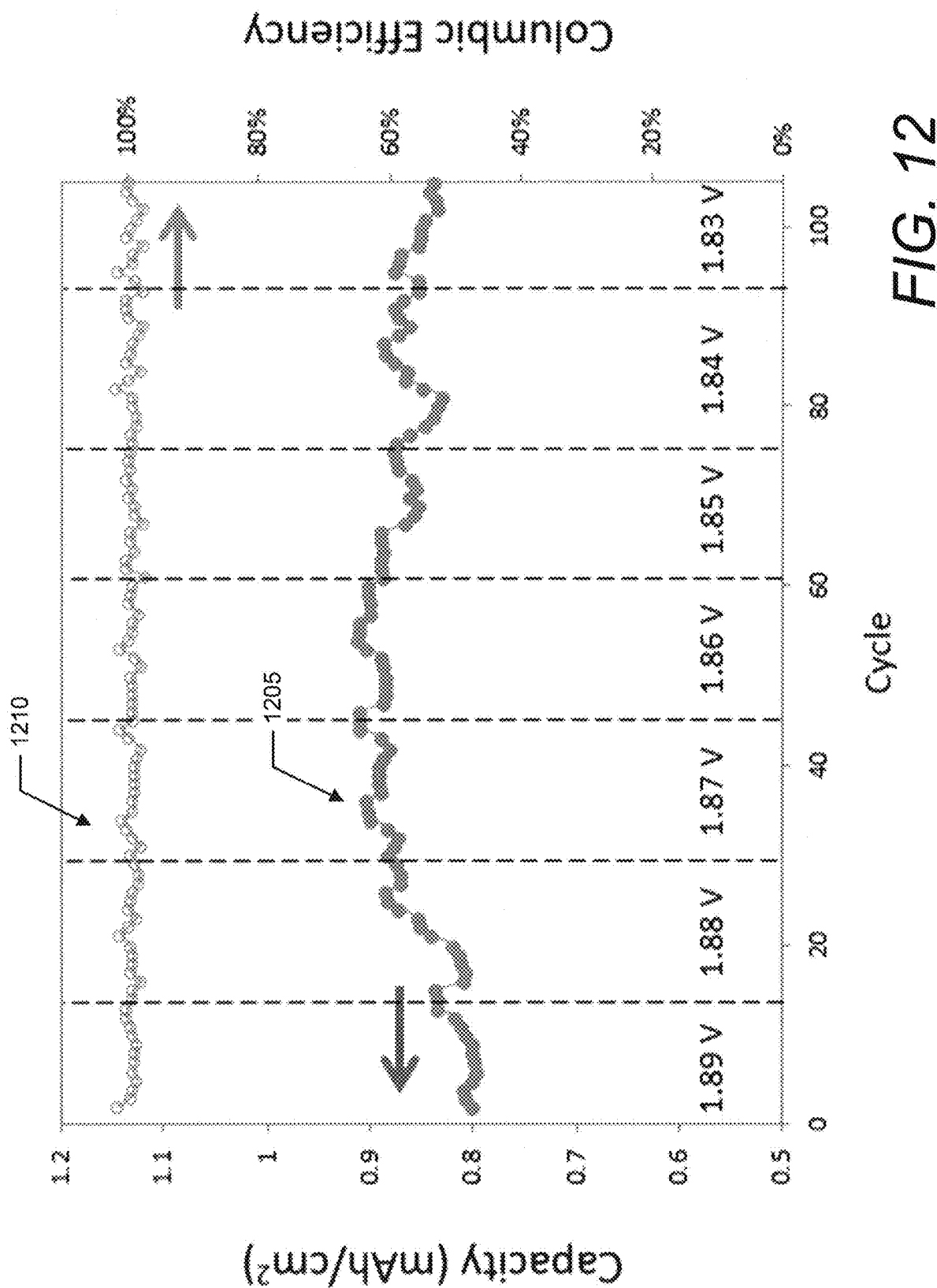
FIG. 12 is a plot of capacity and columbic efficiency versus cycles showing capacity regeneration control through modifying cut-off charging voltage.

FIGS. 11A and 11B are charts demonstrating experimental result of an example embodiment demonstrating the control of the healing reaction by changing the cut-off voltage. In FIG. 11A, the plot identified by callout 1105 is areal capacity (mAh/cm$^2$) and the plot identified by callout 1110 is Coulombic efficiency. In FIG. 11B, the plot identified by callout 1115 is areal capacity (mAh/cm$^2$) and the plot identified by callout 1120 is Coulombic efficiency. In certain example embodiments, the healing reaction induced capacity regeneration is controlled, at least in part, by increasing or decreasing the cut-off voltage. When charging is cut off at 1.7 V and 1.8 V (the Region A in FIGS. 11A and 11B), the capacity degradation is 70% and 30% over 30 cycles, respectively. However, with higher cut-off voltage of 1.9 V (Region B), the capacity can be regenerated and slowly growing over cycles. The weight of active MnO2 increases at higher cut-off voltage, and at the same time PH value of electrolyte decreases. In FIG. 12, the plot identified by callout 1205 is areal capacity (mAh/cm$^2$) and the plot identified by callout 1210 is Coulombic efficiency. FIG. 12 further demonstrates that capacity regeneration is controlled by cut-off voltages. With cut-off voltage reducing from 1.89 V to 1.83 V, the capacity shows a transition from increment to degradation with a plateau at a transition region near 1.86 V. These support the capacity regeneration control method through modifying cut-off voltage that affects the activity of healing reaction. In certain embodiments, the effectiveness of voltage control also relies on types of current collectors and loaded amount of active materials.

Figure 13B:
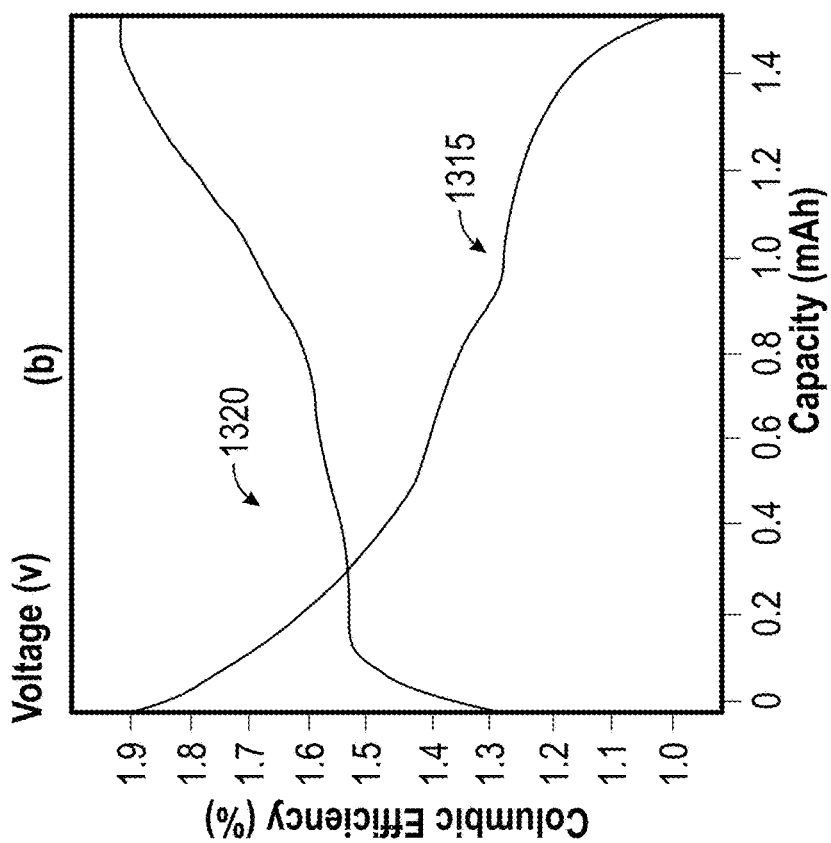
FIG. 13B is a plot of voltage versus capacity for the corresponding voltage capacity profile with a constant voltage step at end of charging. Region A is conventional constant current charging and Region B is constant current charging with a constant voltage charging at the end.
Figure 13A:
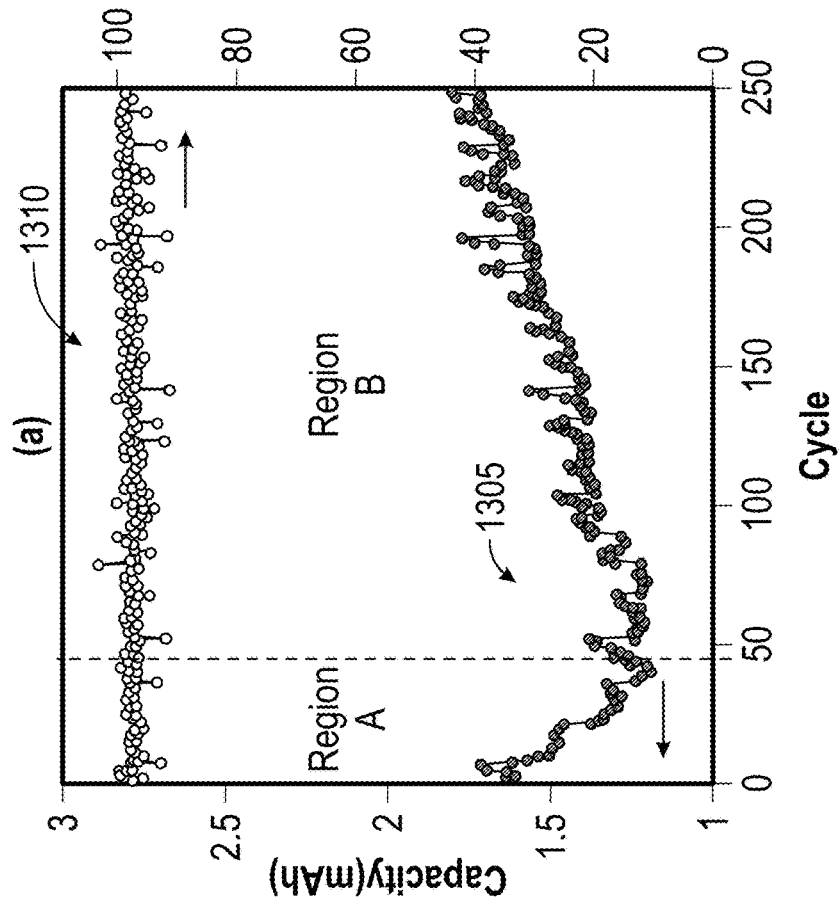
FIG. 13A is a plot of areal capacity and columbic efficiency versus cycles for an example battery system with capacity regeneration controlled through a constant voltage charging step at end of charging process.

As discussed above, in certain example embodiments, capacity regeneration may be managed or controlled, at least in part, by increasing or decreasing the cut-off voltage. In other example embodiments, capacity regeneration control may be realized, at least in part, through a constant voltage step during or at end of charging. This example method of capacity regeneration is demonstrated by experimental results shown in FIGS. 13A and 13B. In FIG. 13A, the plot identified by callout 1305 is capacity (mAh) and the plot identified by callout 1310 is Coulombic efficiency. FIG. 13A shows that capacity degradation at Region A is turned to increment at Region B in which a constant voltage charging step is added at the end of charging process. The added charging step shows activated healing reaction that regenerate the capacity. The voltage capacity profile is shown in FIG. 13B to demonstrate the charging method. A turning point during the discharge process at (9.5 mAh, 1.27 V) confirms the co-intercalation of proton and zinc ion into MnO2. In certain example embodiments, the duration for this constant voltage step is tuned to achieve different degree of capacity regeneration.

FIGS. 14A and 14B shows the evidence and the example of controlling voltage to tune the healing reaction and the corresponding capacity regeneration. FIG. 14A plots the dQ/dV relation to voltage where Q is the charging capacity. The figure indicates major capacity generates around 1.5 V to 1.6 V, and a secondary peak around 1.65 V. They are ascribed to the work reaction involving both proton and $Zn^{2+}$ diffusion. It also shows a ramping up after around 1.85 V indicating the starting and dominating of healing reaction which happens at higher voltage and provides capacity regeneration. FIG. 14B shows the reaction time difference during one cycling test. The time for healing reaction is about 7% of the overall charging process. Changing the percentage will change the regeneration effect, thus the capacity performance of the battery. In certain example embodiments, the time for healing reaction is about 1%, about 2%, about 3%, about 4%, about 5%, about 6%, about 7%, about 8%, about 9%, about 10%, about 11%, about 12%, about 13%, about 14%, about 15%, about 16%, about 17%, about 18%, about 19%, about 20%, about 21%, about 22%, about 2 3%, about 24%, about 25%, about 26%, about 27%, about 28%, about 29%, or about 30% of the total charging time.

Figure 15:
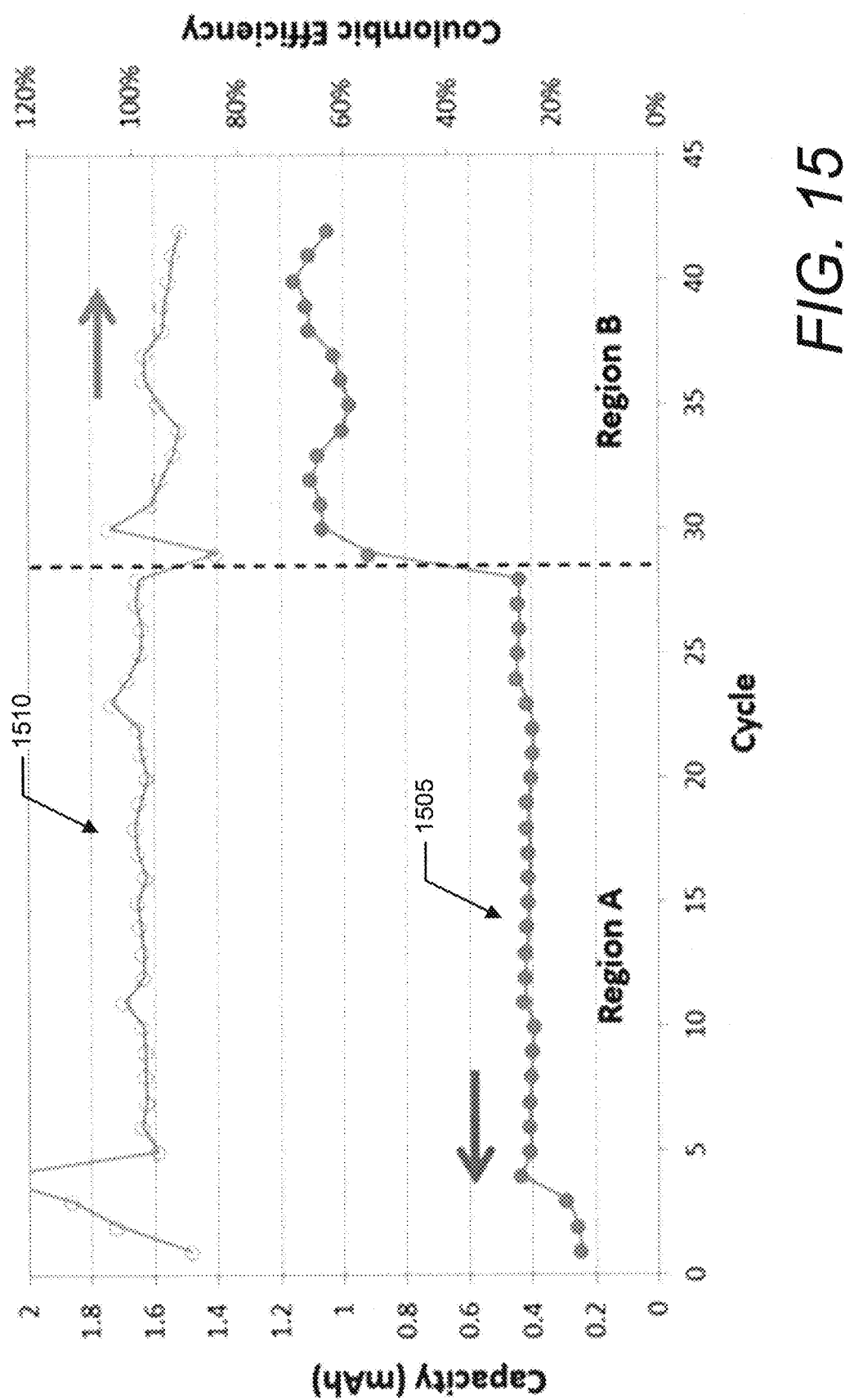
FIG. 15 is a chart showing experimental results in the form of capacity (mAh) versus cycle number and Coulombic Efficiency versus cycle number. It shows the control of capacity regeneration through electrolyte concentration.

In certain embodiments, capacity regeneration is controlled, at least in part, by tuning the salt concentrations. FIG. 15 shows an example of this capacity regeneration control method through tuning the electrolyte salt concentrations. In FIG. 15, the plot identified by callout 1505 is capacity (mAh) and the plot identified by callout 1510 is Coulombic efficiency. Battery performance is monitored while altering the ZnSO4 to MnSO4 ratio in the electrolyte. Region A is the testing with Zn/Mn ratio of 10:1, the battery shows the capacity around 0.4 mAh after 3 activation cycles and the coulombic efficiency is from 97% to 100%. When the Zn/Mn ratio is changed to 2:1, in which case the concentration of Mn ions is increased by 5 times, the battery performance shows a difference. In certain embodiments, the example capacity almost doubles to around 1 mA and the average coulombic efficiency is around 94%. Both regions have the same current density and voltage setting. These results validate that the healing reaction can be controlled by tuning electrolyte concentrations.

Figure 16:
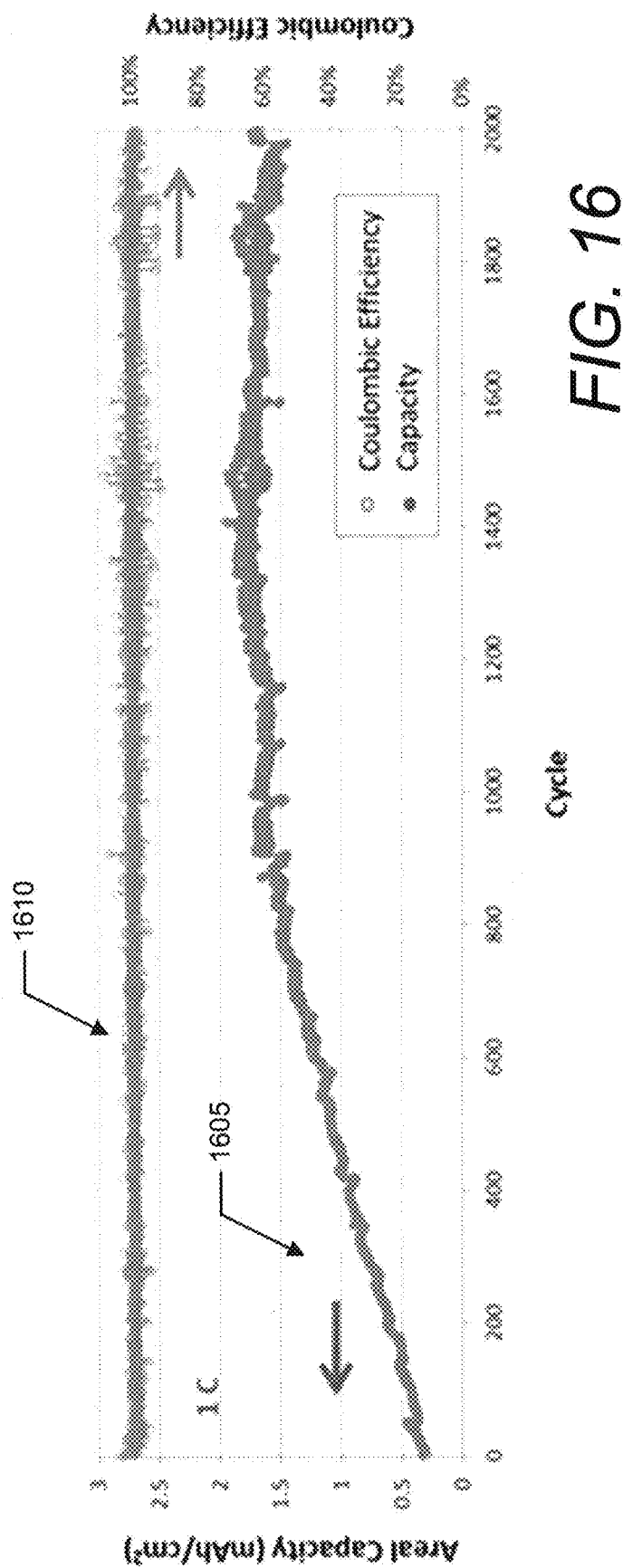
FIG. 16 is a plot of areal capacity and columbic efficiency versus cycles showing cycling performance testing with high durability.
Figure 17:
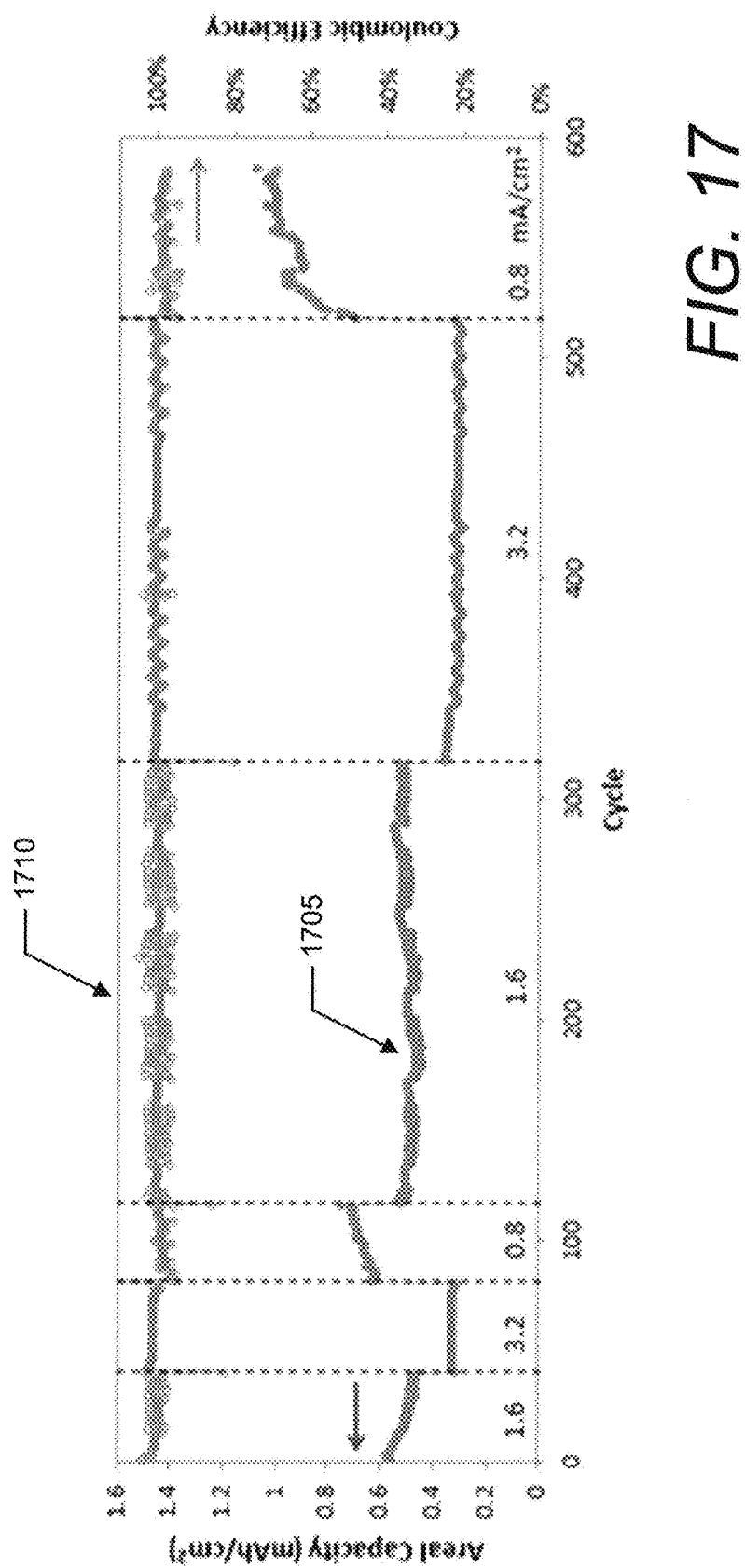
FIG. 17 is a plot of areal capacity and columbic efficiency versus cycles showing example battery performance with variated current rates.
Figure 18:
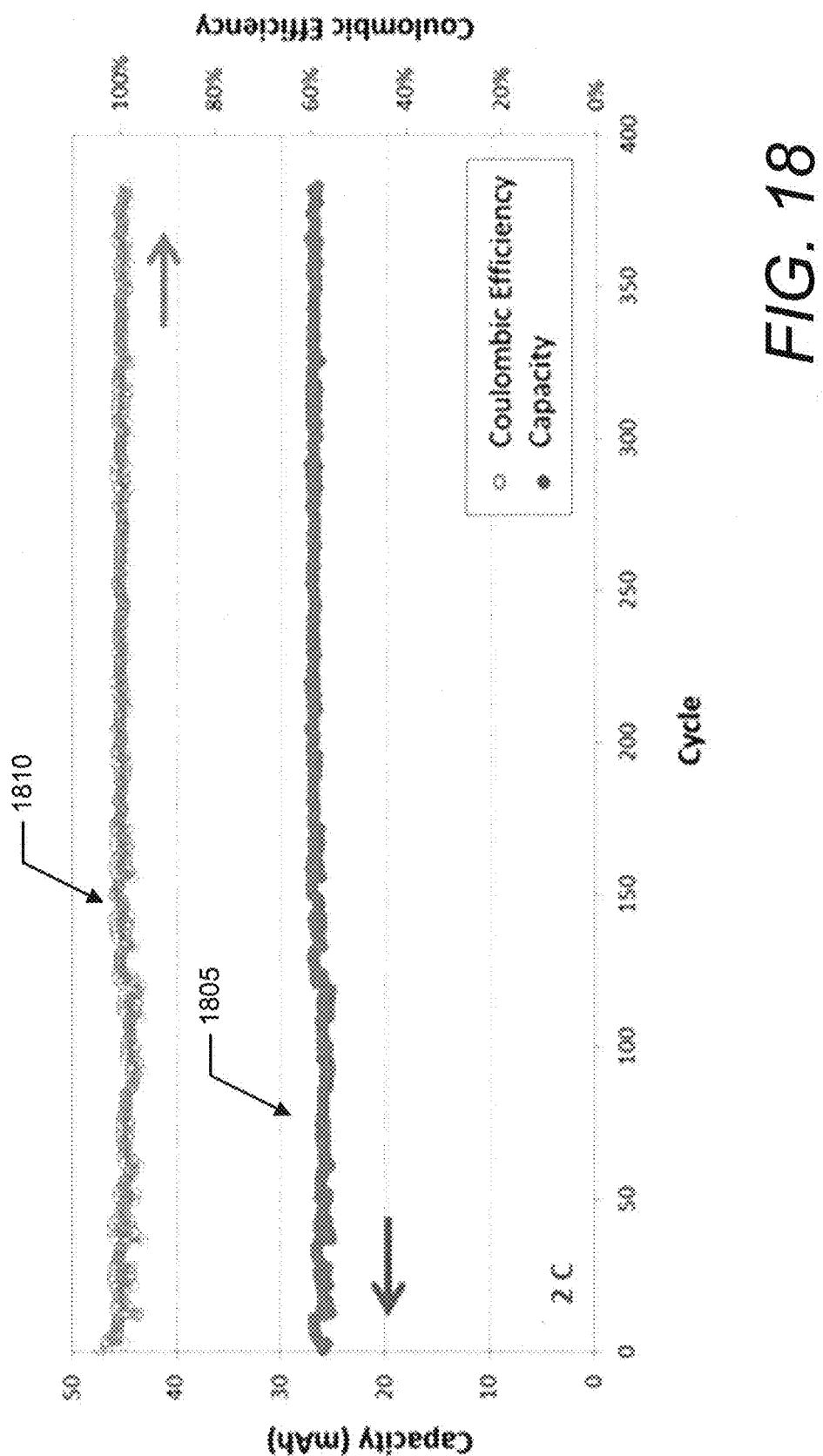
FIG. 18 is a plot of capacity and columbic efficiency versus cycles showing example battery performance at 2 C current rate.
Figure 19:
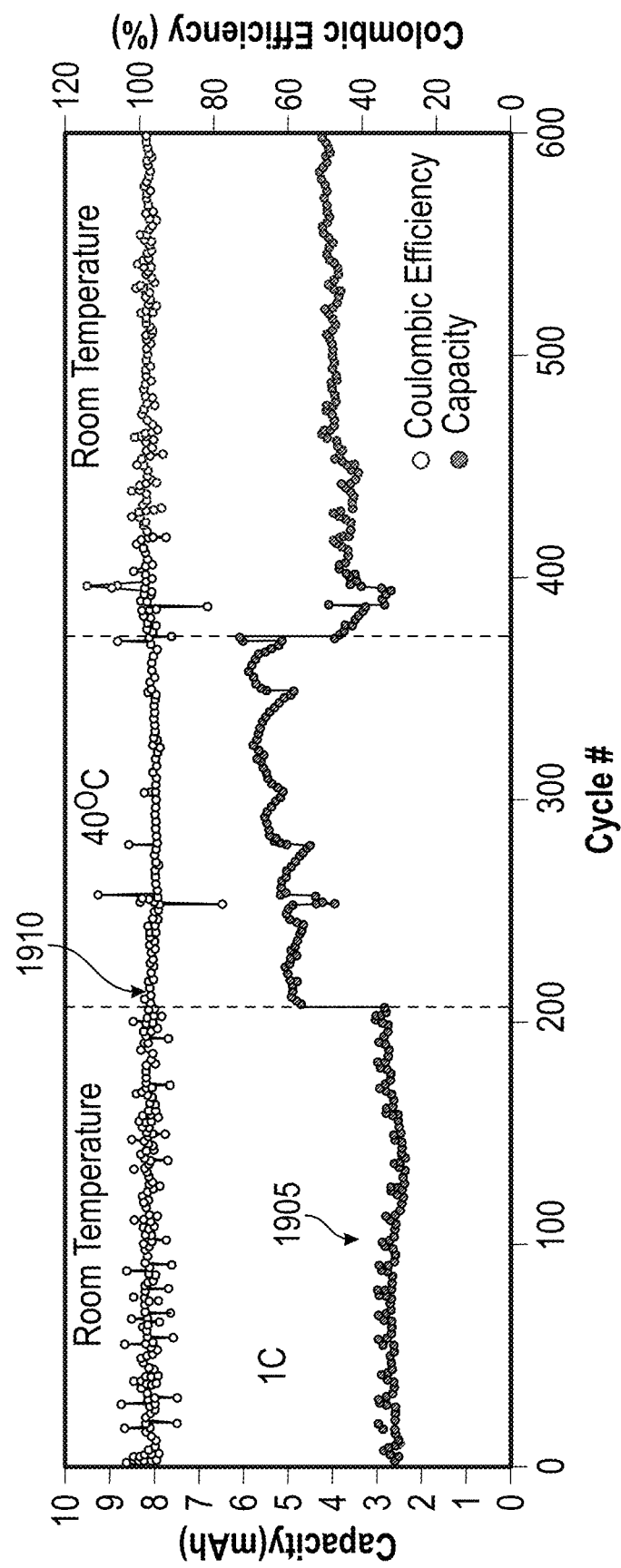
FIG. 19 is a plot of capacity and columbic efficiency versus cycles showing capacity versus cycles for different temperatures of example batteries.
Figure 20:
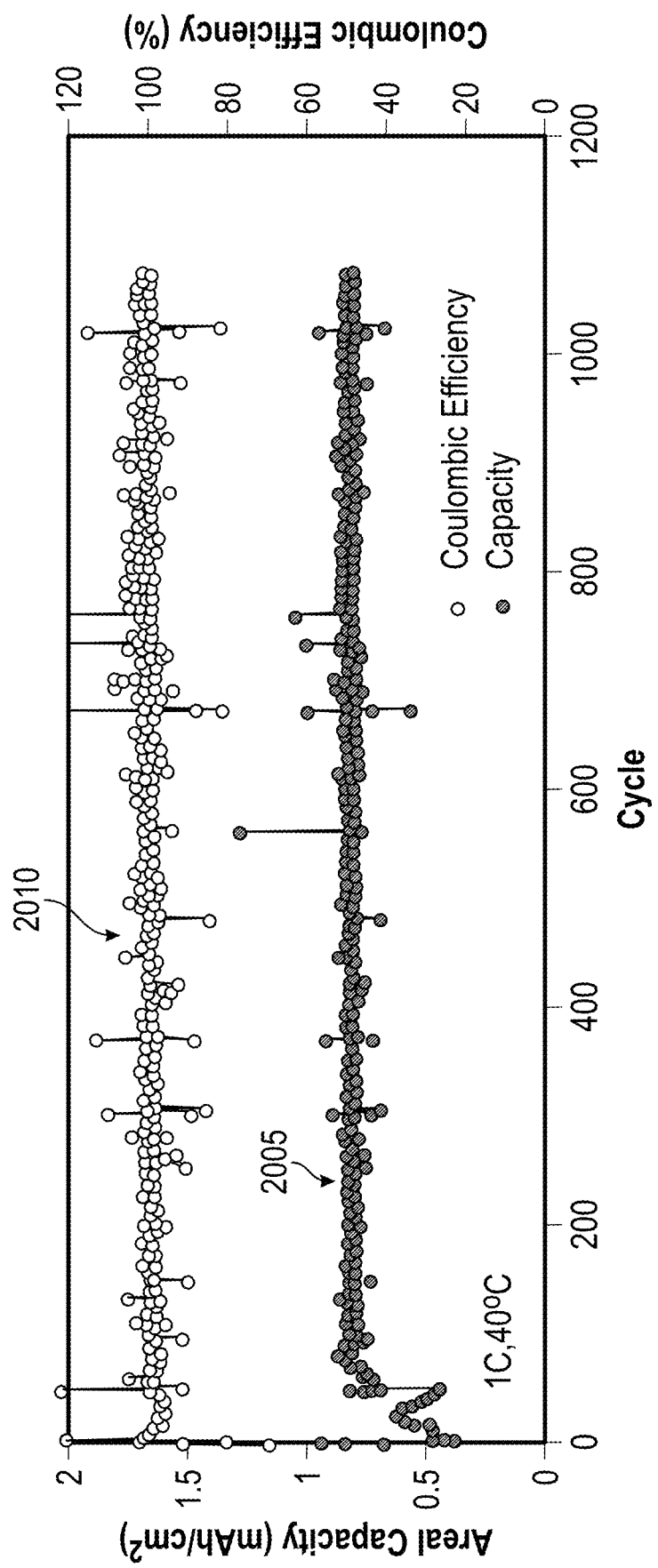
FIG. 20 is a plot of areal capacity and columbic efficiency versus cycles showing cycling performance test of a battery system at 40° C.

The example capacity regeneration control methods for excess electrolyte Zn ion battery may permit high cycling stability at different current rates (current densities) and even elevated temperatures. FIG. 16 is the durability experimental results at 1 C current rate at room temperature. In FIG. 16, the plot identified by callout 1605 is areal capacity ($mAh/cm^2$) and the plot identified by callout 1610 is Coulombic efficiency. The results do not indicate degradation after even 2000 cycles and the coulombic efficiency keeps a high value of 98% to 99%. FIG. 17 further shows that variation of current density from 0.8 $mA/cm^2$ to 3.2 $mA/cm^2$ does not affect the durability. In FIG. 17, the plot identified by callout 1705 is areal capacity ($mAh/cm^2$) and the plot identified by callout 1710 is Coulombic efficiency. The cell maintains a stable coulombic efficiency of 97% to 100% and sustainable capacities. FIG. 18 is the durability test at 2 C current rate with high coulombic efficiency of 99% and stable capacity over 400 cycles. In FIG. 18, the plot identified by callout 1805 is areal capacity ($mAh/cm^2$) and the plot identified by callout 1810 is Coulombic efficiency. FIG. 19 is showing the impact of high temperature (40° C.) on the stability of the battery cell. This compares favorably with Li ion battery and lead acid batteries, which show rapid capacity degradation at higher temperature and 40° C. normally cut half their lifetime. However, example batteries according to the present disclosure show high tolerance to the high temperature impact. The cell shows stable capacity for 200 cycles at room temperature and when temperature increases to 40° C., the capacity almost doubles due to faster kinetics. After cycling at 40° C. for about 200 cycles, the temperature is cooled to room temperature for another 200 cycles and the cell does not show sign of degradation. More capacity is regenerated during high temperature: 40° C. cycling increases the capacity by almost 50%. In certain example embodiments, temperature is used, at least in part, to control capacity regeneration. FIG. 20 further demonstrates the high cycling durability of electrolyte flooded Zn ion battery at high temperature. In FIG. 20, the plot identified by callout 20005 is areal capacity ($mAh/cm^2$) and the plot identified by callout 2010 is Coulombic efficiency. At 40° C., the coulombic efficiency is constantly higher than 97% and there is no sign of capacity degradation even after 1100 cycles.

Figure 21A:
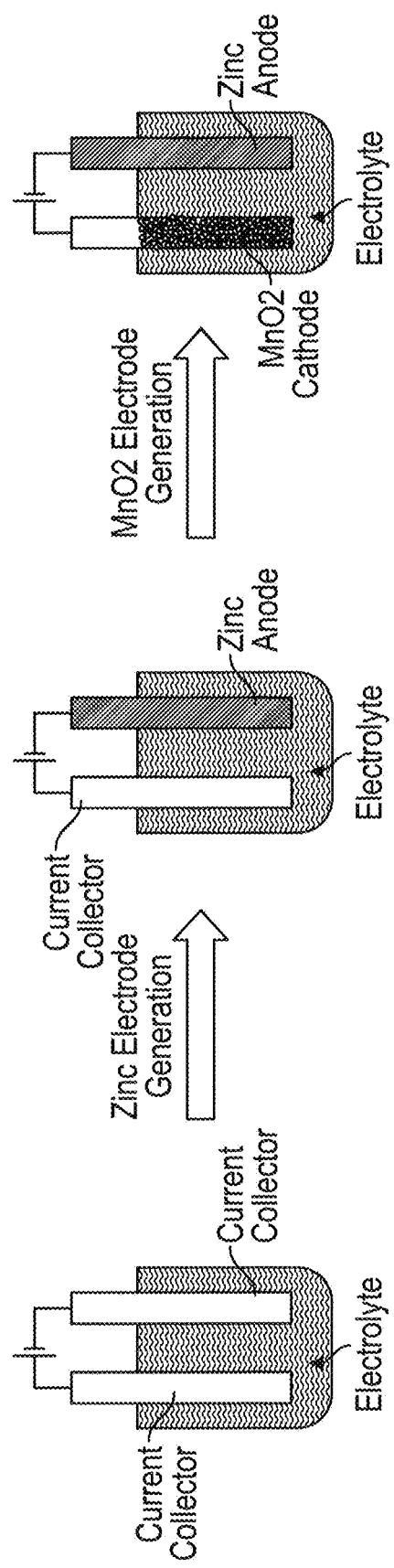
FIG. 21A is a flow chart of an example in-situ battery fabrication process.
Figure 21B:
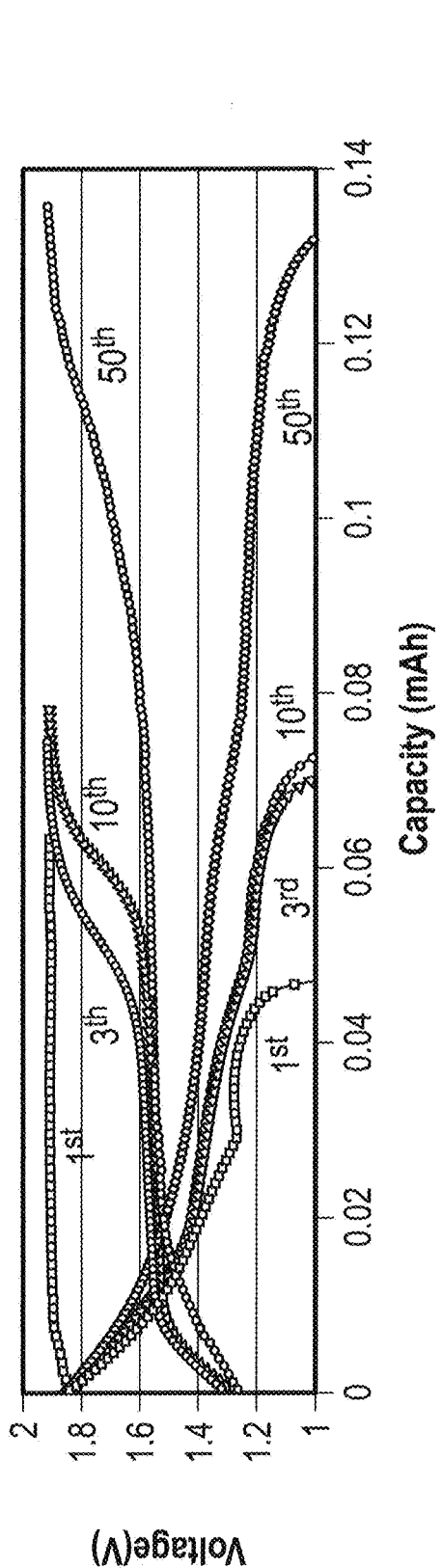
FIGS. 21B and 21C are plots showing example in-situ fabricated battery performance.
Figure 21C:
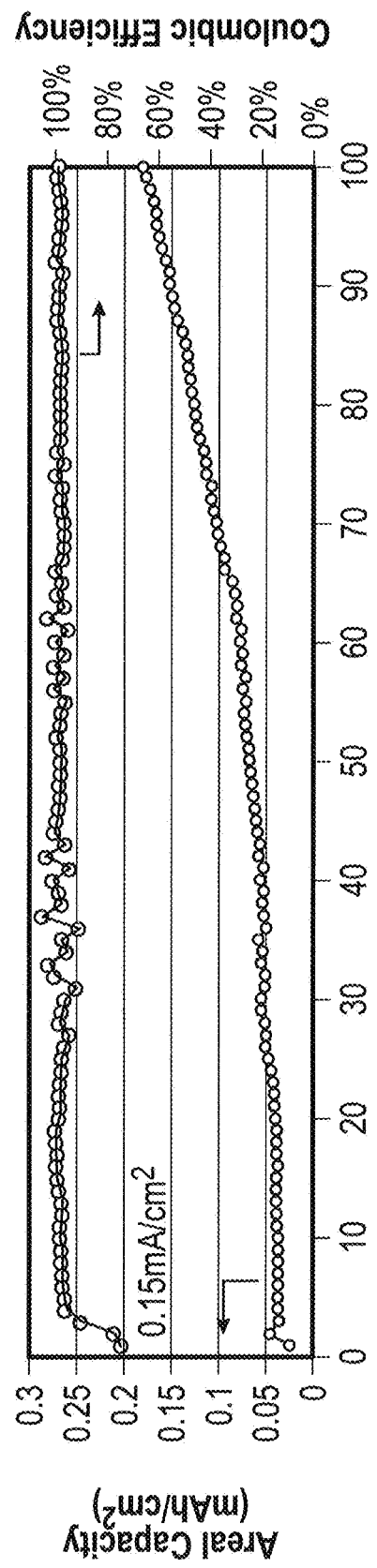

In certain embodiments of the electrolyte excess battery configuration and capacity regeneration method, in situ battery fabrication can be implemented. "In situ" may include embodiments where the elimination of electrode materials is performed, at least in part, thought high temperature and protective gas synthesis and where electrode preparation may include, at least in part, processes such as coating, pressing, drying, or annealing. Therefore, in situ battery fabrication may effectively reduce the cost for battery manufacturing. A process using zinc anode and MnO2 cathode as the demonstration example is shown in flow chart form in FIG. 21A. The current collects without active electrode materials are directly assembled with the electrolyte. The electrolyte is controlled depending on the steps of the fabrication. Example current collectors can be any electrically conductive materials such as stainless steel, copper, nickel, aluminum, carbon, conductive polymers, carbon coated polymer and their combinations. Afterwards, the electrode generation, capacity generation, is applied by controlling one or more of voltage, current density, temperature, and salt relative concentrations, or combinations of these properties. The fabrication method may include one or more of pulse electroplating, electrodeposition, constant voltage electrodeposition, constant current electrodeposition, pulse electrodeposition, cyclic voltammetric deposition, and electrophoretic deposition. In example embodiments, the electrolyte for electrode generation contains cations such as $Zn^{2+}$, $Mn^{2+}$, proton, $Al^{3+}$, $Na^+$, $K^+$, $Mg^{2+}$, $Ni^{2+}$, $Cu^{2+}$, $Fe^{3+}$, $Co^{2+}$, $Ca^{2+}$, $NH_4^+$, etc., anions such as $PO_4^{3-}$, $SO_4^{2-}$, $CH_3COO^-$; $Cl^-$, $F^-$, $Br^-$, $NO_3^-$, $BO_3^{3-}$, etc., and polymer additives such as ionomers, polypyrrole, polyaniline, polycarbonate, poly(vinyl acetate), Polyethylene glycol, Poly(methyl methacrylate), etc. This electrode generation process will enable growth of zinc particles and MnO2 particles on the surfaces of both current collectors. Through electrode generation, the zinc anode and manganese oxide cathode are formed and the functioning electrolyte can be filled. In certain embodiments, the cell is used as the final product. This process has been successfully evidenced by an example using constant current electrodeposition and the corresponding experimental results are shown in FIGS. 21B and 21C. The figures show results with a constant current density of 0.15 mA/cm2 and cutoff voltage of 1.9 V. FIG. 21b shows the voltage-capacity profiles at 1st, 3rd, 10th and 50th cycles. The first cycle is the activation cycle with a flat charging plateau at 1.9 V and a regeneration capacity of 0.047 mAh. And after 50 cycles the capacity has increased by 3 times to 0.13 mAh. The turning points of discharging curve also shift to right side with increased capacity. This indicates the increased amount of both intercalated proton and zinc ion into MnO2 cathode materials. The increment is clearly shown in FIG. 21c in which the areal capacity continuously increases over 100 cycles. Note that the coulombic efficiency increases from 70% in the first few activation cycles to a constant 98% in the following cycles, indicating a very good battery architecture.

Figure 22:
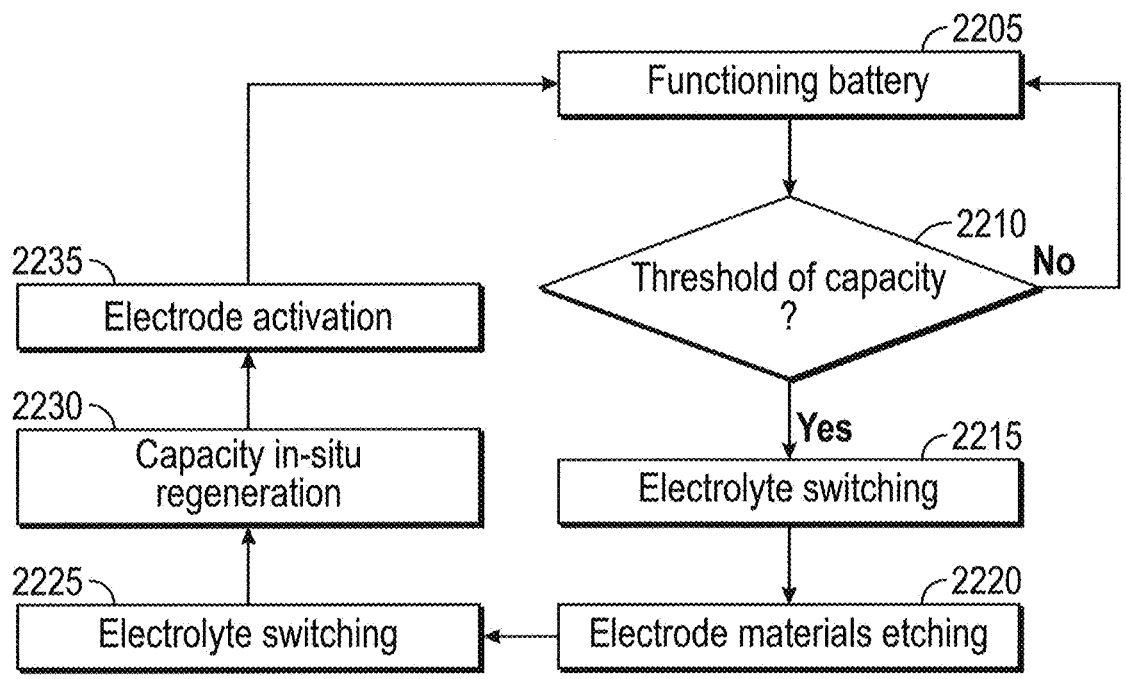
FIG. 22 is a flow chart of an example in-situ battery regeneration method.
Figure 23:
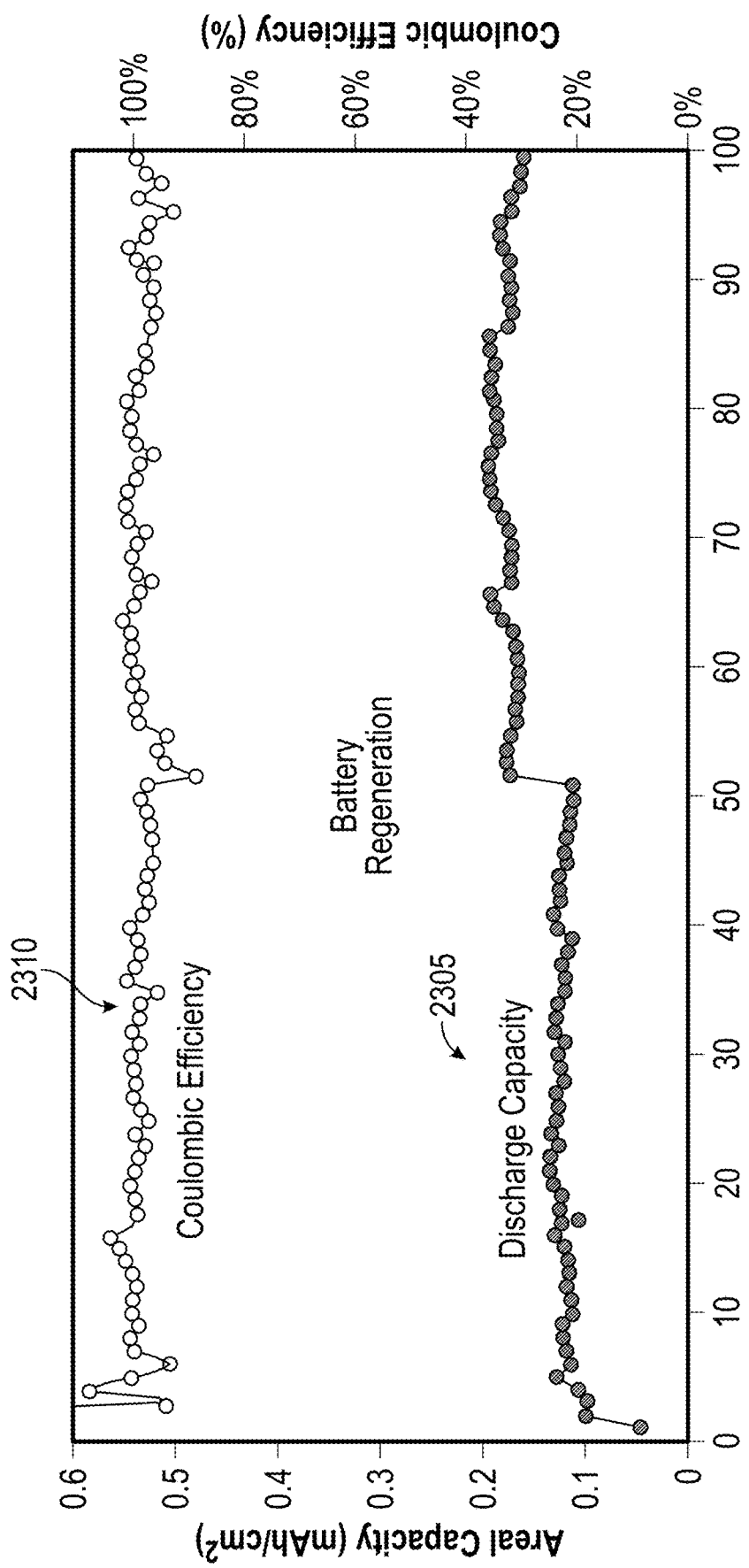
FIG. 23 is a plot of areal capacity and columbic efficiency versus cycles showing example in-situ regenerated battery performance.

The example excess electrolyte Zn ion battery permits convenient battery regeneration when battery capacity falls to certain percentage of the designed capacity., In example embodiments the threshold percentage for regeneration may be 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, or 89% . . . . The regeneration process has been illustrated in FIG. 22. At block 2205, the battery is functioning by charging/discharging cycling with designed capacity, voltage, current rate and energy efficiency. At block 2210, the battery system determines if the battery falls to a certain percentage of designed capacity, for example 80% in the figure. In other example embodiments, the battery system uses a different percentage of capacity to determine whether or not to perform the etching, for example 50%, 60%, 70%, etc. If it is determined to perform electrolyte switching, then in block 2215 the electrolyte is switched to etching electrolytes. In block 2220, the etching electrolytes perform an etching of active electrode materials and thereby only current collectors are left. In certain example implementations, the etching electrolyte can be acidic solutions such as hydrochloric acid, sulfuric acid, nitric acid, phosphoric acid, oxalic acid, citric acid or with additional cations such as Zn2+, Mn2+, Al3+, Na+, K+, Mg2+, Ni2+, Cu2+, Fe3+, Co2+, Ca2+, NH4+. Physical treatments such as applied electric field, heating, stirring, sonication might be used with or in place of the etching electrolyte. In block 2225, then electrolyte is switched for in-situ battery fabrication as described with respect to FIG. 21. In block 2230, in-situ capacity regeneration is performed to generate new electrode materials which will be new functioning battery after in-situ activation step. Example implementations of the polypyrene in-situ capacity regeneration process may include pulse electroplating, electrodeposition, constant voltage electrodeposition, constant current electrodeposition, pulse electrodeposition, cyclic voltammetric deposition, and electrophoretic deposition. In example embodiments, the electrolyte for this regeneration process contains cations such as $Zn^{2+}$, $Mn^{2+}$, proton, $Al^{3+}$, $Na^+$, $K^+$, $Mg^{2+}$, $Ni^{2+}$, $Cu^{2+}$, $Fe^{3+}$, $Co^{2+}$, $Ca^{2+}$, $NH_4^+$, etc., anions such as $PO_4^{3-}$, $SO_4^{2-}$, $CH_3COO^-$, $Cl^-$, $F^-$, $Br^-$, $NO_3^-$, $BO_3^{3-}$, etc., and polymer additives such as ionomers, polypyrrole, polyaniline, polycarbonate, poly(vinyl acetate), Polyethylene glycol, Poly(methyl methacrylate), etc. In block 2235, the newly formed electrodes are active. The battery system then performs as a functioning battery, returning to block 2205. FIG. 23 is an example that demonstrates the described in-situ battery regeneration. In FIG. 23, the plot identified by callout 2305 is areal capacity (mAh/cm$^2$) and the plot identified by callout 2310 is Coulombic efficiency. A fabricated battery following process described in FIG. 21 is going through charging/discharging cycling test at 1C rate. The cell is showing discharge capacity of 0.12 mAh/cm$^2$ and coulombic efficiency of about 99%. The test is purposely terminated at $50^{th}$ cycle to order to evaluate the effect of in-situ battery regeneration on battery capacity recovery. After 50 cycles, the battery regeneration is applied following the flow chart in FIG. 22 that electrolyte is switched for in-situ electrode etching and electrolyte is switched back for in-situ electrode generation. The etching liquid in this example contains a mixture of hydrochloric acid and sulfuric acid, with additional cations such as $Zn^{2+}$, $Mn^{2+}$, $Na^+$. With the in-situ capacity regeneration and activation processes as described in blocks 2230 and 2235 of FIG. 22, the performance of regenerated battery is comparable to battery before regeneration with areal capacity of 0.18 mAh/cm$^2$ and coulombic efficiency about 99%. The battery is then continuing another 50 cycles of charging/discharging test which also shows stable performance. This result validates the concept of in-situ battery regeneration in extending battery lifetime.

Figure 24:
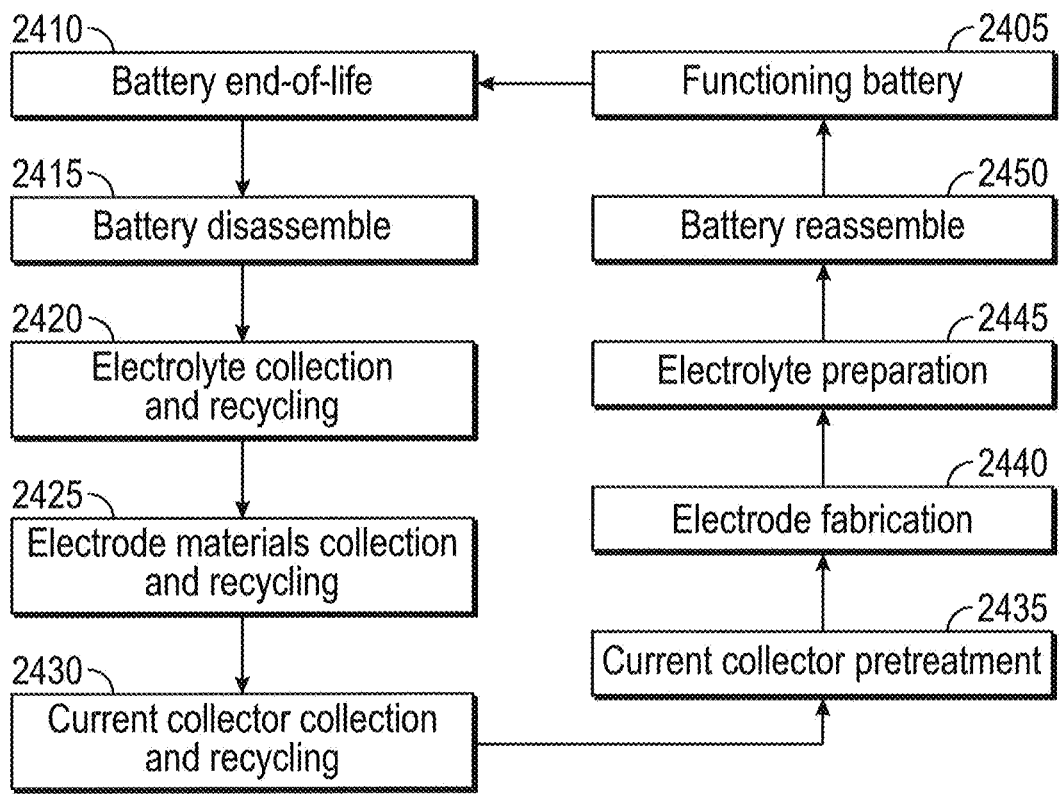
FIG. 24 is a flow chart of an example battery system recycling method.

The example excess electrolyte Zn ion battery also permits convenient battery recycling at the end of life. The process is shown in FIG. 24 whereby the end-of-life battery can be easily disassembled without any crushing process. In block 2405, the battery is functioning. In block 2410, the battery reaches end-of-life. In block 2415, the battery is disassembled into component parts. In block 2420, the electrolyte is collected and recycled. In block 2425, the electrode materials are collected and recycled. In certain example embodiments, the electrode with active materials on current collector can be etched away with etchant solvents, the resulted solution can be recycling to prepare new active materials. In certain embodiments, the electrode, separator and electrolyte are collected and recycled separately. In block 2430, the current collector is collected and recycled. The current collector could therefore be obtained and used for fabrication of new battery cells after pretreatment in block 2435. In block 2440, the electrodes for the new battery are fabricated. In block 2445, the electrolyte for the new battery is prepared. Finally, in block 2450, the new battery in reassembled and the new battery operates as a functioning battery (returning to block 2405).

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the invention. For example, the steps may be combined, modified, or deleted where appropriate, and additional steps may be added. Additionally, the steps may be performed in any suitable order without departing from the scope of the present disclosure.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims. Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. Also, the terms in the claims have their plain, ordinary meaning unless otherwise explicitly and clearly defined by the patentee. The indefinite articles "a" or "an," as used in the claims, are each defined herein to mean one or more than one of the elements that it introduces.

A number of examples have been described. Nevertheless, it will be understood that various modifications can be made. Accordingly, other implementations are within the scope of the following claims.

What is claimed is:

1. A battery system for an aqueous proton and zinc ion battery, comprising:
    an opened structure comprising gas venting ports and electrolyte switching or refilling ports;
    a plurality of electrodes in the opened structure, wherein at least one of the plurality of electrodes is a zinc anode;
    an electrode support frame and dendrite collection space at a bottom of the opened structure;
    an excessively filled electrolyte with an Mn salt additive in flooded format or porous separator-soaking format, wherein both a proton and a zinc ion are charge carriers and participate in a redox reaction for energy storage; and
    a battery control system configured to control battery capacity by measuring battery voltage, wherein the battery control system is remote from the battery, wherein the battery control system is configured to determine if the battery voltage is at a capacity regeneration threshold voltage and if the battery voltage is at or below the capacity regeneration threshold voltage, a capacity regeneration healing reaction is performed, wherein the capacity regeneration healing reaction includes a chemical reaction at an electrode interface to generate new electrode material to regenerate electrode material of the battery due to structure degradation, wherein the new electrode material is different than ion charge carriers used to charge and discharge the battery, wherein a cutoff voltage is increased above the capacity regeneration threshold voltage to allow the capacity regeneration healing reaction to add the new electrode material to the battery.

2. The battery system of claim 1, further comprising:
    one or more reservoir tanks for storing electrolyte; and
    one or more pumps for moving electrolyte between the battery and the reservoir tanks.

3. The battery system of claim 1, further comprising:
    a catalyst cap for gas recombination, the catalyst cap comprising one or more of platinum, palladium, carbon, and metal oxides.

4. The battery system of claim 1, further comprising:
    selectively charge and discharge the battery; and
    if the battery voltage is at or below a capacity regeneration threshold, then perform a capacity regeneration healing reaction by increasing a cut-off voltage to a capacity regeneration voltage and controlling a battery temperature, wherein the capacity regeneration healing reaction comprises a chemical reaction at an electrode-electrolyte interface that generates electrochemically active electrode materials; and wherein the capacity regeneration healing reaction is performed while the battery is being charged.

5. The battery system of claim 4, further comprising:
    one or more processors; and
    a memory comprising executable instruction that, when executed, cause the processor to control the capacity regeneration healing reaction.

6. The battery system of claim 1, further comprising:
    a gas burner for heating the electrolyte;
    a gas pump for moving gases in the battery and the gas burner;
    a gas pump and collection tank for gas collection; and
    one or more fuel cells connected to the battery.

7. The battery system of claim 1, further comprising:
    a heating circuit surrounding, at least in part, the opened structure of the aqueous proton and zinc ion battery.

8. The battery system of claim 1, further comprising thermal insulation, wherein the thermal insulation comprises one or more of fiberglass, mineral wool, cellulose, rock wool, polystyrene foam, polyurethane foam, vermiculite, perlite, and cork.

9. The battery system of claim 1, wherein the capacity regeneration healing reaction comprises a chemical reaction that includes manganese at an electrode-electrolyte interface that generates electrochemically active electrode materials.

10. The battery system of claim 1, further comprising:
    a thermal insulation covering at least a portion of the battery; and
    one or more sensors to measure one or more of temperature, pressure, PH, liquid level, gas type, ion concentration, voltage, current, and/or resistivity.

11. A battery system for an aqueous proton and zinc ion battery, comprising:
    an opened structure comprising gas venting ports and electrolyte switching or refilling ports;
    a plurality of electrodes in the opened structure, wherein at least one of the plurality of electrodes is a zinc anode;
    an electrode support frame and dendrite collection space at a bottom portion of the opened structure;
    an excessively filled electrolyte with an Mn salt additive in flooded format or porous separator-soaking format; and
    a battery control system configured to:
        control battery capacity by measuring battery voltage;
        selectively charge and discharge the battery; and if the voltage of the battery is at or below a capacity regeneration threshold, then perform a capacity regeneration healing reaction by increasing a cut-off voltage to a capacity regeneration voltage and controlling a battery temperature, wherein the capacity regeneration healing reaction comprises a chemical reaction at an electrode-electrolyte interface that generates electrochemically active electrode materials; and wherein the capacity regeneration healing reaction is performed while the battery is being charged; and wherein both a proton and a zinc ion are charge carriers and participate in a redox reaction for energy storage.

12. The battery system of claim 11, further comprising:
one or more reservoir tanks for storing electrolyte;
one or more reservoir tank for storing etching liquid;
one or more reservoir tank for storing distilled water;
one or more reservoir tank for storing organic solvents such as ethanol, acetone, isopropyl alcohol, toluene; and
one or more pumps for moving electrolyte, etching liquid, water, organic solvents between the battery and the reservoir tanks.

13. The battery system of claim 11, further comprising:
a catalyst cap for gas recombination, the catalyst cap comprising one or more of platinum, palladium, carbon, and metal oxides.

14. The battery control system of claim 11, wherein the battery control system comprises:
one or more processors; and
a memory comprising executable instruction that, when executed, cause the processor to control the capacity regeneration healing reaction.

15. The battery control system of claim 11, further comprising one or more sensors to measure one or more of temperature, pressure, PH, liquid level, gas type, ion concentration, voltage, current, and resistivity.

16. The battery control system of claim 11, wherein the battery control system is remote from the battery.

17. The battery system of claim 11, further comprising:
a gas burner for heating the electrolyte; and
a gas pump for moving gases in the battery and the gas burner; and
a gas pump and collection tank for gas collection; and
one or more fuel cells connected to the battery.

18. The battery system of claim 11, further comprising a heating circuit surrounding, at least in part, the battery system.

19. The battery system of claim 11, further comprising a thermal insulation covering, at least in part, the battery system.

* * * * *